(12) United States Patent
Shknevsky et al.

(10) Patent No.: US 12,045,517 B1
(45) Date of Patent: Jul. 23, 2024

(54) STORAGE ALLOCATION TECHNIQUES FOR LARGE WRITES BASED ON RESERVING ONE OR MORE ADDITIONAL CHUNKS OF A BLOCK

(71) Applicant: Dell Products L.P., Hopkinton, MA (US)

(72) Inventors: Alexander Shknevsky, Fair Lawn, NJ (US); Oran Baruch, Tel Aviv (IL); Maor Rahamim, Ramla (IL); Vamsi K. Vankamamidi, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/094,116

(22) Filed: Jan. 6, 2023

(51) Int. Cl.
*G06F 3/06* (2006.01)
(52) U.S. Cl.
CPC ............ *G06F 3/0683* (2013.01); *G06F 3/061* (2013.01); *G06F 3/0665* (2013.01)
(58) Field of Classification Search
CPC ..... G06F 3/0601; G06F 3/0665; G06F 3/0683
See application file for complete search history.

(56) References Cited

U.S. PATENT DOCUMENTS 10,365,827 B1\* 7/2019 Satish ................. G06F 12/1072
2008/0005468 A1\* 1/2008 Faibish ................. G06F 3/0622
711/170

\* cited by examiner

*Primary Examiner* — Chie Yew
(74) *Attorney, Agent, or Firm* — Muirhead and Saturnelli, LLC

(57) ABSTRACT

Techniques of the present disclosure can include: identifying blocks of storage available for allocation; generating a list denoting an allocation order of storage chunks of the blocks; receiving a write I/O operation that writes data to a first logical address; allocating a storage chunk in accordance with the allocation order of the list, wherein a first block includes the storage chunk and a second storage chunk; storing the first data in the storage chunk of the first block; removing the second storage chunk from the list; and creating a mapping between the first logical address and the first block indicating the second storage chunk is reserved for storing content written to a logical address included in a volume logical address range comprising the first logical address. The allocation order can spread allocation distance between blocks and chunks of the same block to avoid contention during flushes.

20 Claims, 18 Drawing Sheets

STORAGE ALLOCATION TECHNIQUES FOR LARGE WRITES BASED ON RESERVING ONE OR MORE ADDITIONAL CHUNKS OF A BLOCK

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques of the present disclosure can include a computer-implemented method, a system a non-transitory computer readable medium. The system can include one or more processors and a memory including code that, when executed performs the method. The non-transitory computer readable medium can include code that, when executed, performs the method. The method can comprise: identifying a plurality of blocks of storage available for allocation, wherein each of the plurality of blocks is partitioned into a plurality of storage chunks; generating a main list denoting an allocation order of the plurality of storage chunks; receiving a first write I/O operation that writes first data to a first target logical address; responsive to receiving the first write I/O operation, performing first processing including: allocating a first storage chunk from the plurality of storage chunks in accordance with the allocation order denoted by the main list, wherein a first block of the plurality of blocks includes the first storage chunk and a second storage chunk of the plurality of storage chunks; storing the first data in the first storage chunk of the first block; removing the second storage chunk of the first block from the main list; and creating, in a mapping table, a first mapping between the first target logical address and the first block, wherein the first mapping indicates that the second storage chunk of the first block is available for allocation and is reserved for storing content written to a logical address included in a first volume logical address range, wherein the first volume logical address range includes the first target logical address.

In at least one embodiment, processing can include: receiving a second write I/O operation that writes second data to a second target logical address; and determining whether the mapping table includes a mapping with a corresponding volume logical address range including the second target logical address, wherein said determining whether the mapping table includes a mapping with a corresponding volume logical address range including the second target logical address further includes: determining whether the second target logical address is included in the first volume logical address range of the first mapping; and responsive to determining that the second target logical address is included in the first volume logical address range, determining that the mapping table includes a mapping with a corresponding volume logical address range including the second target logical address. Responsive to determining that the second target logical address is included in the first volume logical address range, second processing can be performed which includes: allocating the second storage chunk for storing the second data of the second target logical address; and storing the second data in the second storage chunk of the first block.

In at least one embodiment, processing can include: responsive to determining that the mapping table does not include a mapping with a corresponding volume logical address range including the second target logical address, performing third processing including: allocating a third storage chunk of the plurality of storage chunks in accordance with the allocation order denoted by the main list, wherein a second block of the plurality of blocks includes the third storage chunk and a fourth storage chunk of the plurality of storage chunks; storing the second data in the third storage chunk of the second block; removing the third storage chunk of the second block from the main list; and creating, in the mapping table, a second mapping between the second target logical address and the second block, wherein the second mapping indicates that the fourth storage chunk of the second block is available for allocation and is reserved for storing content written to a logical address included in a second volume logical address range, wherein the second volume logical address range includes the second target logical address.

In at least one embodiment, processing can include: determining, in accordance with one or more criteria, whether to remove one or more reserved storage chunks of the mapping table, wherein the one or more reserved storage chunks includes the second storage chunk associated with the first mapping; and responsive to determining to remove one or more reserved storage chunks from the mapping table performing second processing including: removing the second storage chunk associated with the first mapping from the mapping table indicating that the second storage chunk is no longer reserved; and adding the second storage chunk of the first block to the main list indicating that the second storage chunk is available for subsequent allocation in accordance with the allocation order denoted by the main list. Adding the second storage chunk to the main list can include adding the second storage chunk to a head of the main list. After adding the second chunk to the head of the main list is performed, the head of the main list can identify the second storage chunk as a next subsequent chunk to be allocated in accordance with the allocation order denoted by the main list. The one or more criteria can include a condition that indicates to remove one or more reserved storage chunks from the mapping table periodically after a specified amount of time has elapsed. The one or more criteria can include a condition that indicates to remove one or more reserved storage chunks from the mapping table periodically after a specified number of chunk allocations is performed. The specified number of chunk allocations can include allocating one or more chunks from the main list in accordance with the allocation order denoted by the main list. The specified number of chunk allocation can include allocating one or more reserved chunks each associated with a corresponding mapping of the mapping table and each associated with a corresponding volume logical address range.

In at least one embodiment, the mapping table can be a hash table, and logical addresses can be used as keys to index into the hash table to a corresponding hash table entry associated with a volume logical address range and a reserved storage chunk.

In at least one embodiment, each of the plurality of blocks can include N storage chunks, and wherein said generating the main list can further comprise forming N sets of lists, wherein each of the N sets of lists identifies corresponding ones of the N storage chunks from each of the plurality of blocks. A first set of the N sets of lists can include a first of the N storage chunks from each of the plurality of blocks. Forming the N sets of lists can include, for each of the first storage chunks from each of the plurality of blocks, placing said each first storage chunk in a selected list of the first set having an associated index L, wherein L=j modulo J2, wherein j is a block index uniquely identifying said each block of the plurality of blocks, and wherein J2 denotes a number of block descriptors stored in a single page. A second set of the N sets of lists can include a second of the N storage chunks from each of the plurality of blocks. Forming the N sets of lists can include, for each of the second storage chunks from each of the plurality of blocks, placing said each second storage chunk in a selected list of the second set having an associated index L2, wherein L2=J2+(j modulo J2). The lists of the first set can be ordered by increasing values of L associated with the lists of the first set, and the lists of the second set can be ordered by increasing values of L2 associated with the lists of the second set. The plurality of blocks can be included in a plurality of storage areas. Each of the plurality of storage areas can have an associated unique index k. Each storage chunk in each list of the first set and the second set can have an associated index k identifying a particular one of the plurality of storage areas which includes said each storage chunk, and wherein storage chunks in said each list can be ordered in said each list based on increasing values of k corresponding to particular ones of the plurality of storage areas to which the storage chunks of said each list belong. Storage chunks of said each list having a same associated index k can be ordered based on increasing block index values for j corresponding to blocks which include the storage chunks of said each list.

In at least one embodiment, generating the main list can further include appending the N sets of lists to a tail of an existing main list, wherein the tail denotes the end of the main list and is associated with a corresponding end storage chunk, wherein a head of the main list identifies a next storage chunk to be allocated in the allocation order, wherein the allocation order denoted by the main list is a consecutive allocation ordering of storage chunks from the head of the main list to the tail of the main list.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
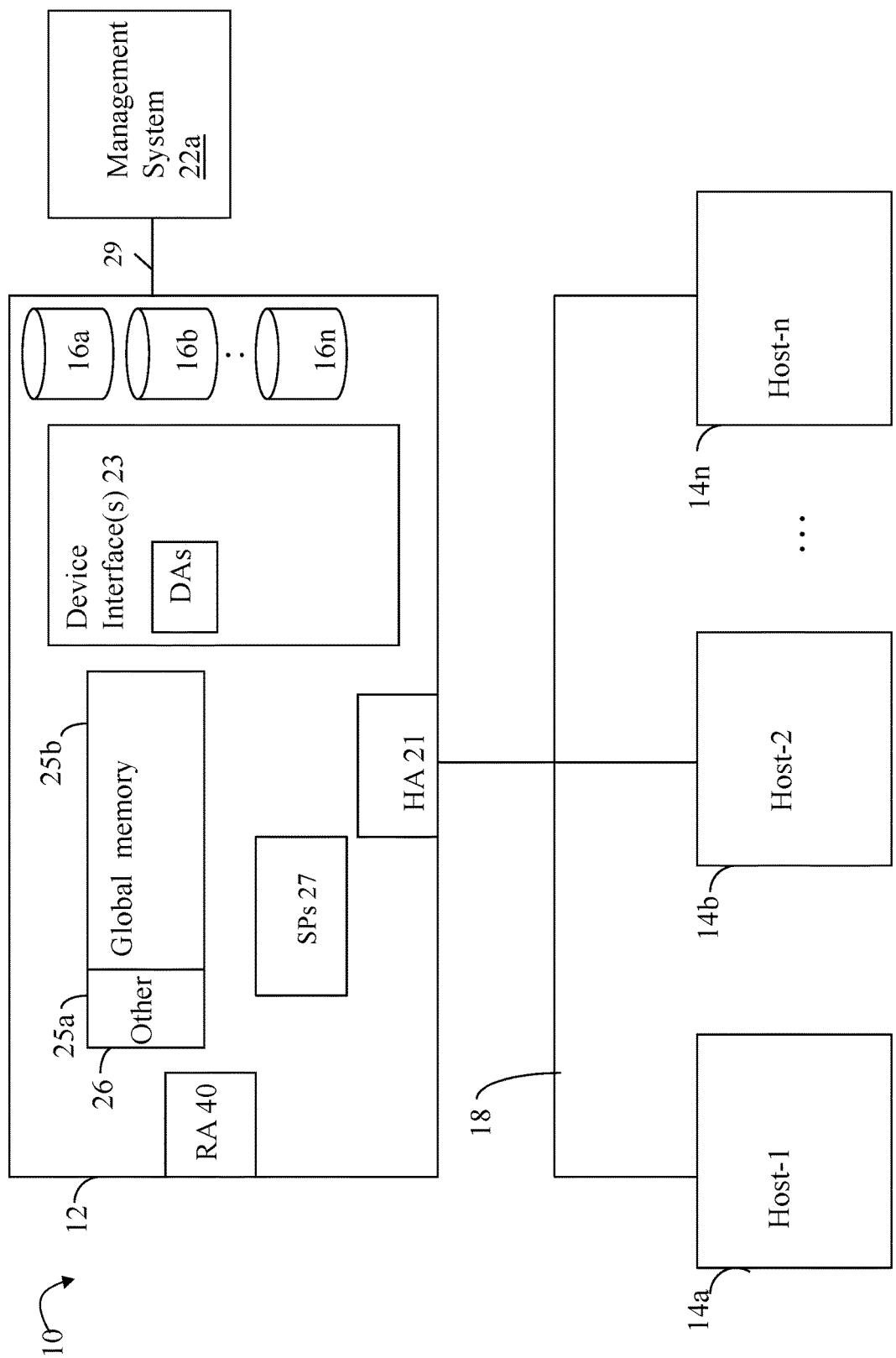
FIG. 1 is an example of components included in a system in accordance with the techniques of the present disclosure.

A data storage system can be a log based system or log structured system (LSS) which persistently records write I/O operations, as well as possibly other operations, in a log. Subsequently, the recorded operations can be flushed from the log. Use of the log provides for improved I/O performance and improved I/O latency. In at least one system, NVRAM persistent storage devices can be used as storage of the log.

Ingest write-bandwidth of many storage systems is limited by the connectivity to its NVRAM devices used for the log. Increasing this write-bandwidth limitation can be accomplished by also writing to other slower devices for logging content written by large writes. In at least one embodiment as described herein, an active-active storage system can be an LSS system including two nodes or two storage controllers where each one such node may serve incoming I/Os concurrently. The system can use a log and log component to record write I/Os. The log component can thus have 2 methods of persisting the write data depending on the size of the write data. One is with a page buffer (PB) which is located in the NVRAM persistent storage, and the second one is in a PLB (physical large block) which resides on non-volatile backend (BE) physical storage devices, such as on an SSD (solid state storage device) tier of the BE storage devices. A PB in NVRAM persistent storage can be used to record or log content for small write I/Os having an associated write payload less than a maximum size. Alternatively, the PLBs of the log can be used to directly store content or data written by large write I/O operations such as write I/O operations having an associated write data payload equal to or greater than the specified maximum size. To describe the data and associated write I/O operation, a persistent descriptor (PDESC) can also be maintained in the log, where each PDESC for a recorded write I/O operation can include metadata information including the target logical address of the write I/O operation. The PLB tier of the BE storage can include storage areas or ubers of storage as described herein. In at least one embodiment, each uber can correspond to 64GBs of consecutive or contiguous storage space on the BE storage devices, and each uber can be further divided into 8 GB sub-units called sub ubers. Thus for large writes, the log component can directly log or record the write I/O data of the log on PLBs of the SSD tier.

In connection with storing or logging the write data of such large write I/Os on the SSD tier, the system can allocate buffers for storing the logged write data from the PLBs of the SSD tier. Such allocation can be performed in some minimal stripe size granularity of the PLB, where the stripe size can vary with, and be determined by, the RAID parity configuration (e.g., to avoid RMW (read modify write) operations and write each parity and all data of the same stripe only once). Once the logged write data of a write I/O is stored in a PLB of the log, the address of the PLB can be stored in a corresponding PDESC of the logged write I/O operation. Subsequently, the logged write I/O having the write data stored in the PLB can be flushed from the log. Flushing the logged write I/O can include building the mapping information of MD (metadata) pages which map the target logical address of the write I/O to a physical location, such as a physical location of the PLB, on the BE storage device storing the write data. Building the mapping information of MD pages for the flushed write I/O of the log can include updating various MD pages to map the target logical address to the PLB storing the write data.

When flushing (e.g., building the metadata layer of mapping information) large write I/Os and other operations recorded in the log, different flushing approaches can be used. In a first approach a flush orchestrator can be utilized where the flush orchestrator can be a single threaded component that orchestrates and partitions the flush work among several worker threads or processes. In a second approach, rather than have a single flush orchestrator coordinate and assign flush work to worker threads, a worker-based flushing approach can be used where each worker thread can independently operate to pull logged write I/O operations and corresponding write data which is flushed from the log. One problem with the flush orchestrator is that there can be dependencies between the logged data to be flushed. Different target logical addresses of multiple logged write I/Os can store logged write data in the same PLB. Thus, two worker threads accessing the same PLB to flush multiple logged write I/Os for different target logical addresses can be in contention where one of the two threads can be blocked. In a similar manner, with worker-based flushing when each worker has some logical block address (LBA)-based granularity and two different workers pull data from different logical address ranges independently but where the different ranges both have corresponding content stored in the same PLB, one worker can be blocked. To overcome the foregoing problems, the techniques of this disclosure can be used in at least one embodiment to spread the available PLB stripes allocations in a way that two independent flushers will not work on stripes from the same PLB.

During the flush process, information regarding the PLBs storing the logged write data can also be updated. In at least one embodiment, the PLBs can have PLB descriptors for their own metadata and, for example, one PLB descriptor page can store more than one PLB's descriptor information. For example, in at least one embodiment, a page can store 32 PLB descriptors. Efficient flush processes can process several PLBs in parallel and introduce another problem of contention of the PLB descriptor page. Multiple flush processes flushing different PLBs can each require exclusive access to the same PLB descriptor and/or same PLB descriptor page and can thus result in serializing access to the PLB descriptor page. The serialization of the flush processes increases the flush latency and thus can result in a reduced overall system performance. To overcome the foregoing problem, the techniques of this disclosure can be used in at least one embodiment to spread the available PLB allocations in a manner that results in a reduction or elimination of parallel flushers accessing the same PLB descriptors page.

In systems with large ingest writes, common expected I/O-related patterns can include sequential write I/O patterns, sequential overwrite patterns and/or sequential delete patterns. With such patterns and with worker-based flushing, each worker pulls data in LBA-based granularity and cannot guarantee to flush all data of same PLB at once since write data or content stored at multiple different LBAs can be stored in the same PLB. As a result, the following several problems can be introduced. One problem which can result is that additional flush overhead can occur as a result of flushing the same PLB several times when the PLB stores content mapped to multiple target logical address. Another problem is that consecutive writes to sequential logical target addresses can result in random reads when the content written by the consecutive writes are stored in buffers of different PLBs which can be physically located at non-consecutive locations in the PLB tier. Additional garbage collection overhead can result because of the non-consecutive LBAs having content written to the same single PLB when such non-consecutive LBAs are subsequently overwritten or deleted. To address these problems, the techniques of the present disclosure in at least one embodiment can add volume-consecutive allocations support for multiple logical addresses which are consecutive, or more generally, all fall in the same specified logical address range or subrange of the same volume. In at least one embodiment, processing can be performed to maintain a mapping between logical addresses and corresponding PLB stripe allocations storing content or data of the logical addresses. For example, a mapping can store information regarding a first stripe of a PLB storing content of the logical address LA1 written by a first write I/O. LA1 can be expressed as a volume and LBA or offset within the volume). A volume LBA range can be expressed and associated with the first stripe allocation of the PLB. The second stripe of the PLB can be temporarily reserved or removed from the list of stripes generally available for allocation. In at least one embodiment, the second stripe of the PLB can be reserved and temporarily only allocated for use in storing content of a logical address within the volume LBA range associated with the PLB and its first stripe. Within some specified window of time or some number of subsequent consecutive allocation, if the system receives a second write I/O writing second content to another logical address LA2 in the same volume LBA range, the system can allocate the second stripe of the PLB for storing the second content. In this manner, there can be locality of reference with respect to logical addresses within the volume LBA range where content stored within a specified window of time at multiple logical addresses in the same volume LBA range can be stored in the same PLB. After the window of time has passed, or a specified number of subsequent write I/Os or PLB storage allocations has occurred, the system can return the second stripe of the PLB to the general PLB stripe allocation list or pool (if the second stripe has not yet been allocated).

In at least one embodiment, the techniques of the present disclosure can be used to provide an efficient structure and process to resolve all the foregoing problems.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can be expressed in terms of a LUN and logical address or offset location (e.g., LBA or logical block address) on the LUN. Processing can be performed on the data storage system to further map the target location of the received I/O operation, expressed in terms of a LUN and logical address or offset location on the LUN, to its corresponding physical storage device (PD) and location on the PD. The DA which services the particular PD can further perform processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
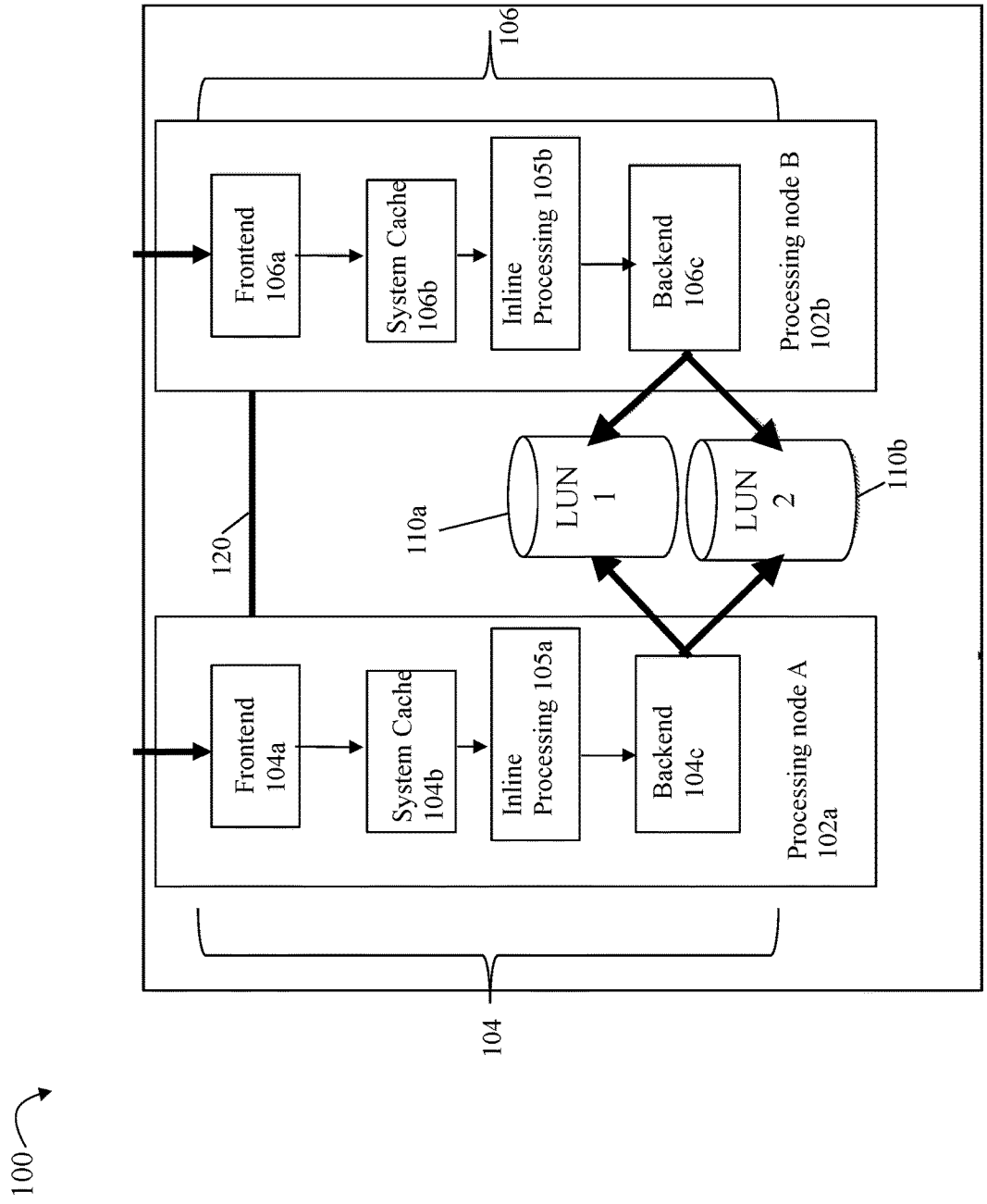
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure (sometimes referred to as a DAE or disk array enclosure) can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a log or journal can be used for recording writes and possibly other information. In one system, the log can be implemented using one or more logging devices that can be shared by both nodes of the dual node architecture. In at least one embodiment, the logging devices can be external with respect to the two nodes and the logging devices can be non-volatile PDs, such as NVRAM storage, accessible to both nodes. Besides the one or more logging devices, the embodiment can include additional BE PDs that provide the BE non-volatile storage for the nodes where the recorded operations stored in the log (e.g., on the log devices) are eventually flushed to the BE PDs as discussed elsewhere herein.

In at least one embodiment, in addition to such a persistently stored log or journal, one or more of the nodes can also include node-local in-memory copies of information of the log. In at least one embodiment, the node-local in-memory copies of information of the log stored on each node can be stored in volatile memory, such as a RAM, that is local to the node and accessed only within the node. For example, a process or thread of code executing on a core or processor of the node can access for reading and/or writing the RAM or other volatile memory that is local to the node.

In a data storage system, minimizing the latency of I/O requests is a critical performance metric. In at least one data storage system using the dual node architecture such as described in connection with FIG. 2, for write operations, latency is determined by the amount of time taken to store the write data in the log where the write data is visible to both nodes or controllers of the system.

Consistent with other discussion herein, the log or journal can be used to optimize write operation latency. Generally, the write operation writing data is received by the data storage system from a host or other client. The data storage system then performs processing to persistently record the write operation in the log or journal. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques herein is provided below.

Figure 3:
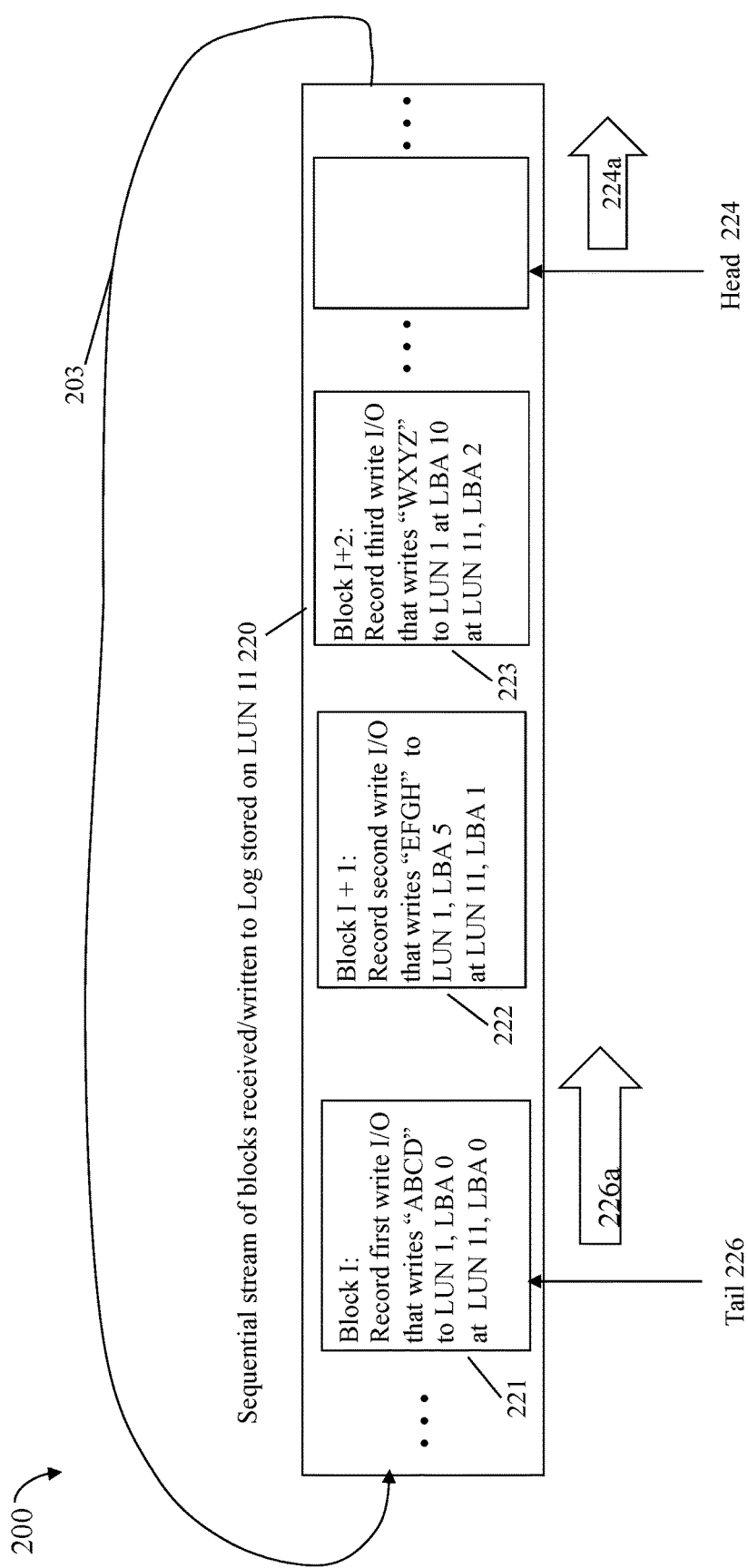
FIGS. 3, 4 and 5 are examples illustrating use of a log structured system in an embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record or log in the log as each next write I/O operation is recorded. When the head pointer 224 reaches the end of the log by writing to the last sequential block or record of the log, the head pointer can advance 203 to the first sequential block or record of the log in a circular manner and continue processing.

The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer can advance 203 to the first sequential block or record of the log in a circular manner and continue processing. Thus, the circular logical manner in which the records or blocks of the log are processed form a logical ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described in more detail in the following paragraphs. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 4:
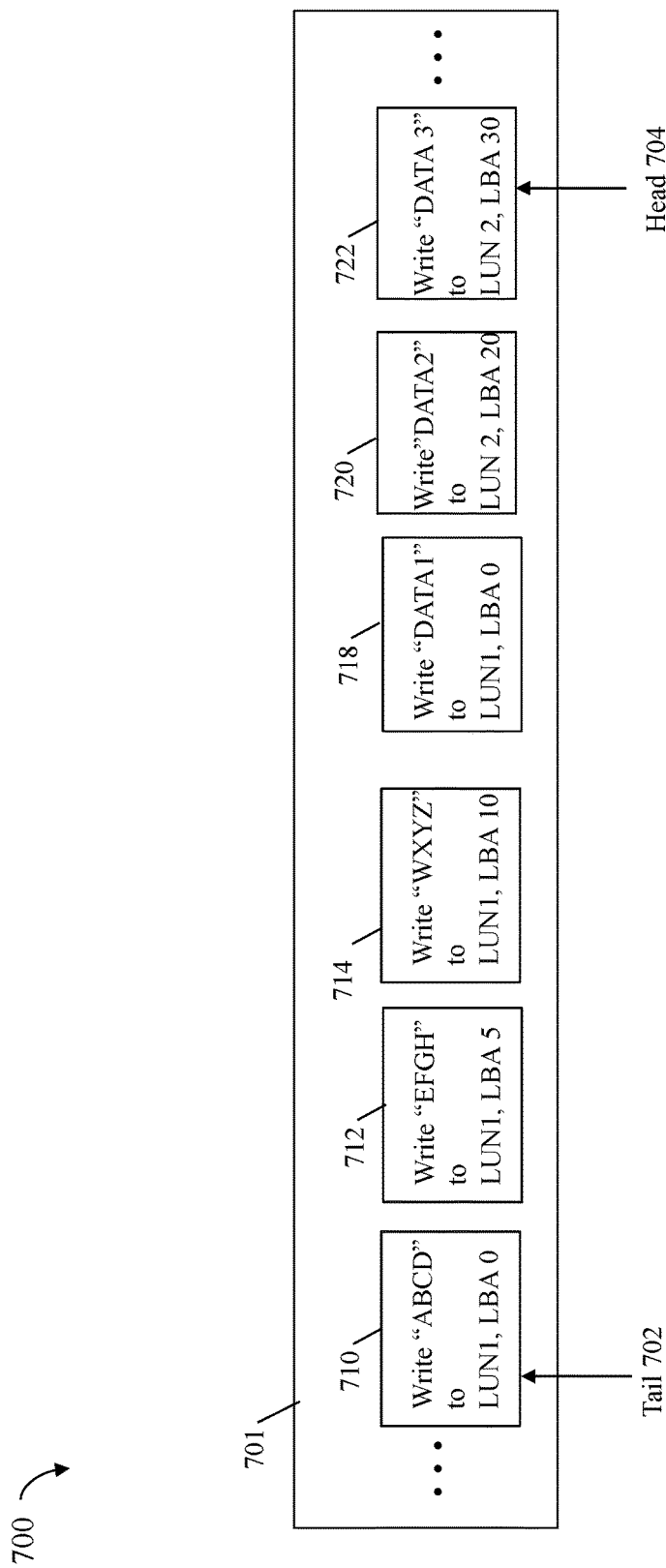

Referring to FIG. 4, shown is an example of information that can be included in a log 701 in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 can also record the write data (e.g., write I/O operation payload) written by the write operations. It should be noted that the log records 710, 712 and 714 of FIG. 4 correspond respectively to the log records 221, 222 and 223 of FIG. 3.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. Such constraints can consider any possible data dependencies between logged writes (e.g., two logged writes that write to the same logical address) and other logged operations in order to ensure write order consistency.

Figure 5:
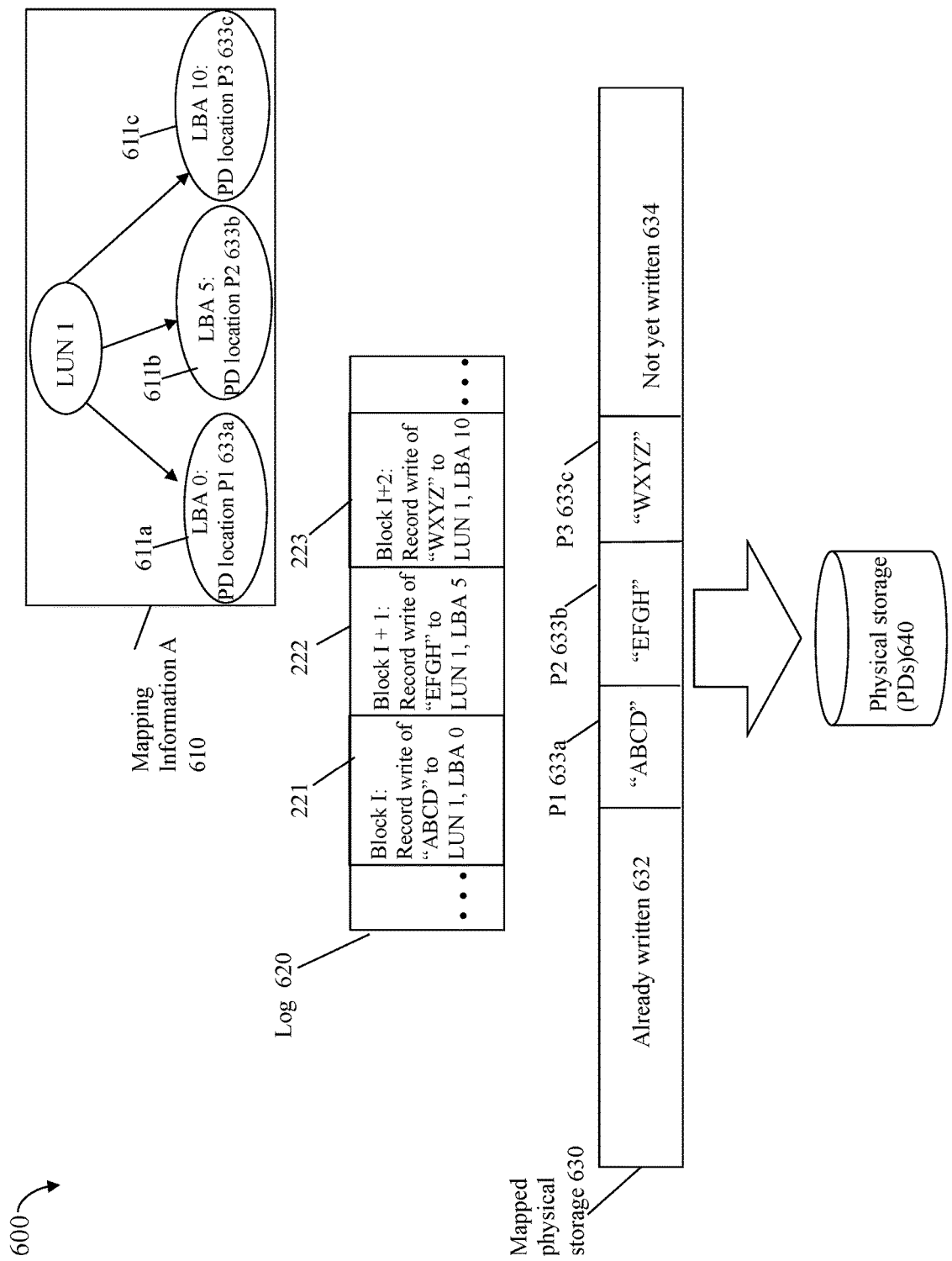

Referring to FIG. 5, shown is an example 600 illustrating the flushing of logged writes and the physical data layout of data on BE PDs in at least one embodiment in accordance with the techniques of the present disclosure. FIG. 5 includes the log 620, the mapping information A 610, and the physical storage (i.e., BE PDs) 640. The element 630 represents the physical layout of the data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which data, such as written user data, can be stored and written to the physical storage 640 as the log records or blocks are flushed. In this example, the records of the log 620 can be flushed and processing sequentially (e.g., such as described in connection with FIG. 3) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223. Generally, data from multiple log entries of the log 620 can be combined into a larger chunk that is written out to physical storage of the BE PDs.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the flushed log data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630. In at least one embodiment, modifications to metadata including mapping information used by the data storage system can also be recorded in the log 620 and flushed to the mapped physical storage 630, and thus the BE PDs 640, in a manner similar to that as described herein for the written user data which can include data written by host-based writes.

Consistent with other discussion herein, the mapped physical storage 630 can correspond to the BE PDs providing BE non-volatile storage used for persistently storing user data as well as metadata, such as the mapping information. With a log structured system as discussed herein, as recorded writes in the log are processed, the data written by the writes can be written to new sequential physical storage locations on the BE PDs. Thus, with a log structured system, the data and associated metadata can be written sequentially to the log 620 and also can be written sequentially to the mapped physical storage 630. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage 630 denoting the physical storage of the BE PDs can also be implemented and managed as a logical circular log in a manner similar to that as described in connection with the log of FIGS. 3, 4 and 5 containing the data prior to being flushed to the physical storage 630 of the BE PDs.

In data storage systems implementing a LSS such as described above, garbage collection can be performed by the data storage system at various times in an embodiment. Garbage collection processing can be performed by the data storage system on the BE PDs to aggregate allocated stored data blocks with valid data to eliminate free unused physical storage locations (e.g., which can store invalid or stale content of overwritten logical addresses) that can be interspersed between the data blocks containing valid data. Such aggregation can include physically copying or moving data blocks of valid user data stored at various physical locations on BE non-volatile storage into a single larger physical storage location. From the perspective of the data storage system, valid data can include the current or most recent copy of client-based write data such as host-based write data (e.g., written by write I/Os received from one or more hosts), as well as the current or most recent copy of flushed metadata, such as the mapping information used by the data storage system to locate a current copy of content associated with a logical address such as, for example, of a read or write I/O operation. After the valid data blocks are relocated from their source locations on multiple source blocks to target locations of a target block, the source blocks can denote larger contiguous chunks of storage which are free and available for reuse. Having such a larger contiguous chunk of free storage facilitates efficiently fulfilling subsequent allocation requests for free BE PD capacity from different components for different uses. Such subsequent allocation requests can include, for example, requests for storing data that is flushed from the log as well as other requests for larger amounts of storage.

A specified size or chunk of physical storage of the BE PDs can be referred to as a physical large block or PLB. In at least one embodiment, garbage collection can be performed on physical storage units that are PLBs. In at least one embodiment, each PLB can be 2 MBs in size. Within a single PLB, the valid data and the holes (e.g., containing invalid data or designated as an unused portion) can be interspersed since, for example, write granularity size units can be 4K chunks or blocks.

In a data storage system implementing an LSS, garbage collection (sometimes denoted herein as GC) can be performed by the data storage system in a continuous manner to manage its BE PDs and reclaim physical storage of holes including unused storage or storage with invalid data. The GC results in performing additional overhead operations such as additional read and write operations in connection with reading valid data from the source PLBs and writing the valid data of the source PLBs to a target PLB. In a data storage system or DS which implements an LSS, such as described above for storing writes or updates to user data, the DS itself can perform GC as needed to obtain free contiguous chunks of storage such as non-volatile storage on the BE PDs. The GC performed by the DS can be done as a maintenance or background task as user logical addresses are overwritten or updated with multiple writes to the same logical address. In this case, the DS can perform GC to reuse the storage which contains old or invalid content that is replaced or updated with new content in the LSS. Consistent with other discussion herein, both valid content and invalid content can be stored within a first large contiguous chunk of storage whereby the DS can perform GC to move the valid content to a second chunk in order to free all storage within the first chunk. Such GC as performed by the DS results in write amplification denoting the extra or additional writes performed in connection with copying or moving valid content in order to obtain the contiguous free chunk of storage.

In at least one embodiment, each PLB can be further partitioned into smaller units of storage such as multiple data pages. For example in at least one embodiment, each PLB can be 2 MB in size where the PLB can be further partitioned into 4K byte pages.

With reference to FIG. 5, in at least one embodiment, the mapping information 610 can be implemented as a hierarchical structure of metadata (MD) pages described in more detail below.

Consistent with discussion herein, the mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 6A:
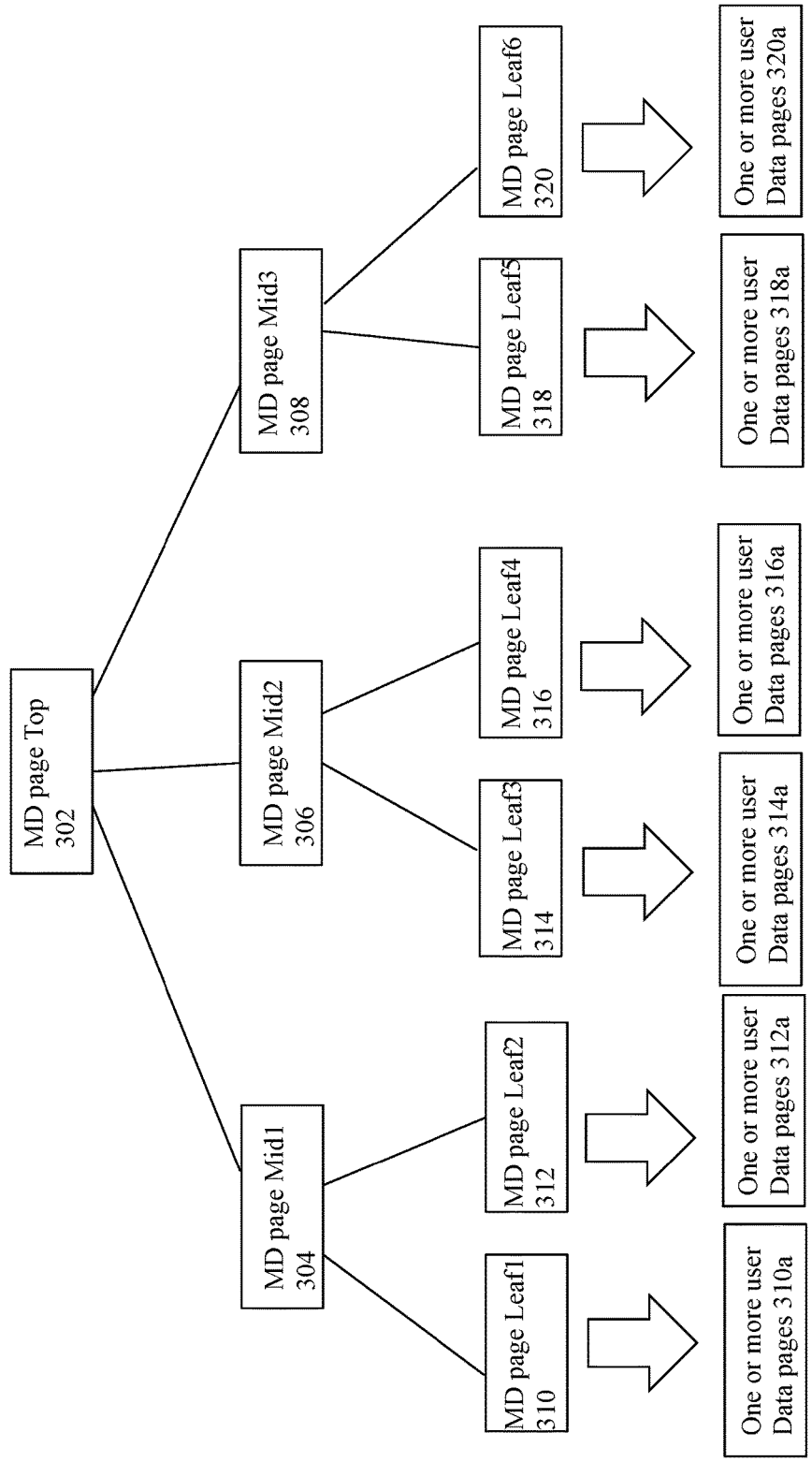
FIGS. 6A-6C are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 6A as including only 3 levels where each node in the tree can have at most 3 child nodes. Generally, the techniques herein can be used with any layered or hierarchical structure of MD pages.

Referring to FIG. 6A, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 6A, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 6B:
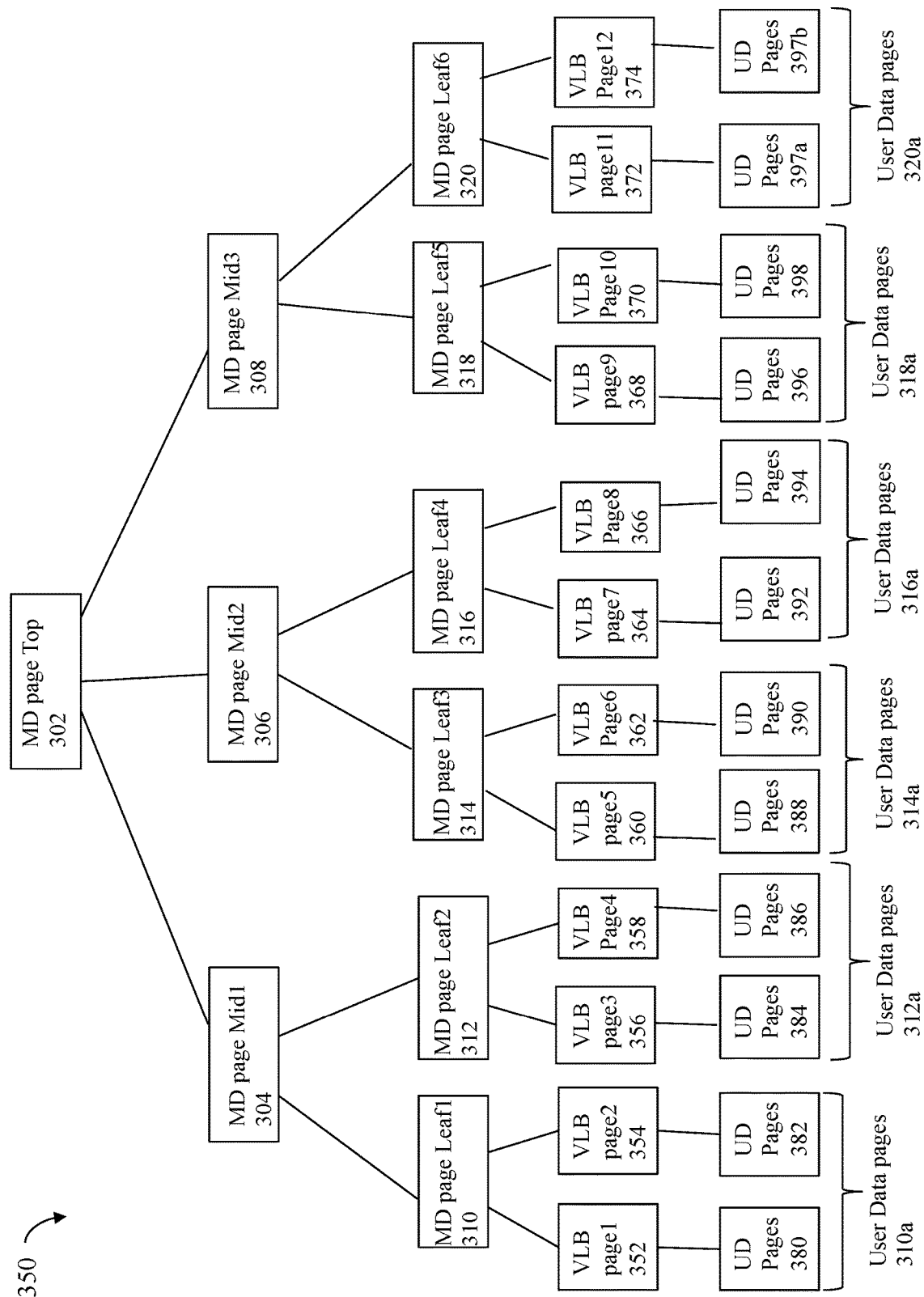

Referring to FIG. 6B, shown is a more detailed version of a hierarchical structure used as the mapping structure 108 that can be used in an embodiment in accordance with the techniques of the present disclosure. The structure 350 is similar to the structure 300 as described and illustrated in FIG. 6A with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 6A. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 6A including data for LBAs 0-511. The UD pages 384 and 386 denote two portions of UD pages corresponding to UD pages 312a of FIG. 6A including data for LBAs 512-1023. The UD pages 388 and 390 denote two portions of UD pages corresponding to UD pages 314a of FIG. 6A including data for LBAs 1024-1535. The UD pages 392 and 394 denote two portions of UD pages corresponding to UD pages 316a of FIG. 6A including data for LBAs 1536-2047. The UD pages 396 and 398 denote two portions of UD pages corresponding to UD pages 318a of FIG. 6A including data for LBAs 2048-2559. The UD pages 397a and 397b denote two portions of UD pages corresponding to UD pages 320a of FIG. 6A including data for LBAs 2560-3072.

In furtherance of the example above regarding UD page X and now with reference to FIG. 6B assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 6C:
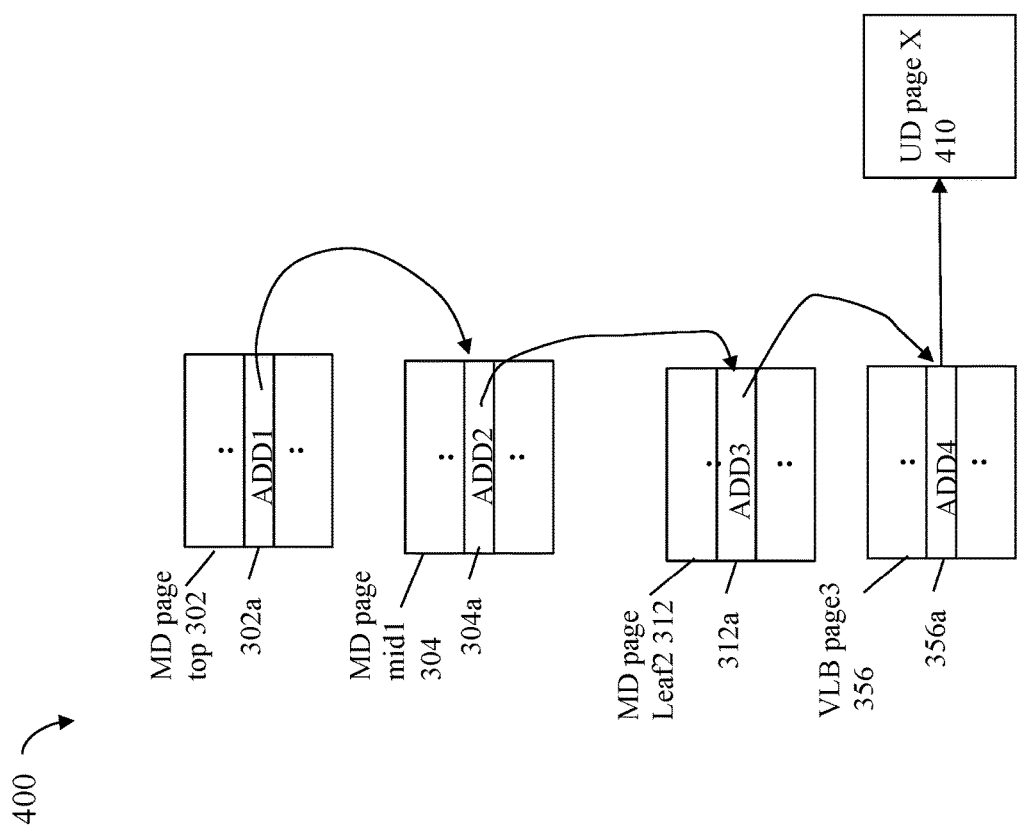

Referring to FIG. 6C, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 6C includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

In at least one embodiment as noted above, each PLB of BE PD storage can be further partitioned into smaller units of storage such as multiple data pages. For example in at least one embodiment, each PLB can be 2 MB in size where the PLB can be further partitioned into 4K byte pages. The element 410 can denote such a smaller unit of storage, such as a 4K byte page, storing user data or content referenced by a VLB entry.

In at least one embodiment, content or data associated with a single VLB can be stored in the same single PLB. However, not all entries of the VLB may be utilized. For example, the VLB may be sparsely populated, or more generally, less than all entries of a single VLB 356 can be mapped to 4K data portions in the single PLB. As a result, multiple VLBs can have their associated content stored in the same single PLB. More generally, one or more VLBs can mapped to the same single PLB thereby denoting that the one or more VLBs have content stored in the same single PLB.

Figure 7:
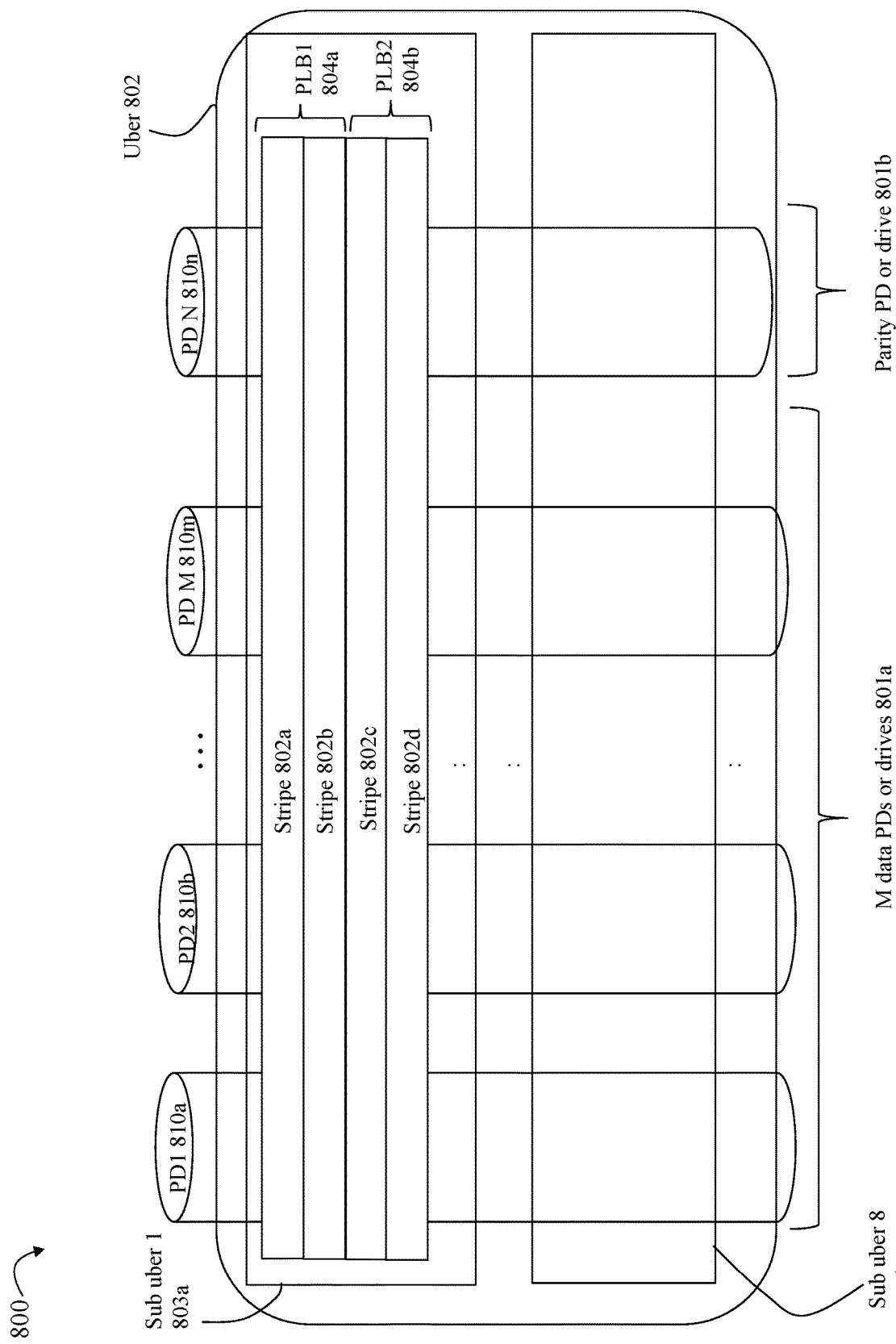
FIG. 7 is an example illustrating a configuration of ubers, sub ubers, PLBs and stripes in at least one embodiment in accordance with the techniques of the present disclosure.

Referring to FIG. 7, shown is an example 800 of BE PDs in at least one embodiment in accordance with the techniques of the present disclosure.

The BE PDs of the example 800 represent the physical storage of a PLB tier of PLBs storing content or user data such as, for example, written by write I/O operations from hosts or other data storage clients. In at least one embodiment, the PLB tier of the BE PDs, as well as other storage of the BE PDs, can include one or more RAID groups based on a RAID configuration providing for parity based redundancy and data protection. For example, in at least one embodiment, the PLB tier can include BE PDs configured into one or more RAID-5 or RAID-6 groups. In the example 800, the PDs 810a-n can denote PDs or drives of a RAID-5 group where the PDs 810a-m are M data drives 801a and PDN 810n denotes the single parity PD or drive 801b. In at least one embodiment, M can be 16 although M can more generally be any suitable number of PDs. For an alternative RAID-6 configuration, the number of parity drives 801b would be 2 PDs rather than 1.

In at least one embodiment, the PLB tier can be include 64 GB units referred to as ubers. Element 802 denotes a single 64 GB uber although the PDs can generally include any suitable number of ubers. Each uber, such as uber 802, can be further partitioned into 8 GB sub-units referred to as sub ubers, where each uber thus includes 8 sub ubers. The uber 802 includes 8 sub ubers 802a (sub uber 1) through 802b (sub uber 8). Data or content and associated parity information can be striped across the PDs 810a-n as denoted by the stripes 802a-d. Each uber can be a contiguous storage area of logically consecutive or contiguous storage stripes such that the uber can correspond to a contiguous consecutive range of logical addresses on the BE PDs. Generally, the uber 802 can include additional stripes and PLBs than as illustrated. In at least one embodiment, each single PLB can store 2 MB of user data or content, along with its associated parity information, and can include multiple stripes based on the size of each stripe. In at least one embodiment, each PLB can be formed from 2-8 stripes depending on the size or user storage capacity of each stripe. For example, assuming M=16 PDs, each stripe 802a-d across the M data PDs can store 1 MB of user data with the associated stripe's parity information stored on PD N 810 of the same stripe. In one such embodiment, each stripe can store 1 MB of user data across the M PDs so that each PLB is formed from 2 stripes. For example, PLB1 804a can include stripes 802a-b; and PLB 2 804b can include stripes 802c-d.

In at least one embodiment of an LSS system as discussed herein, processing of a write I/O operation received from a host or other data storage system client can include recording the write I/O in an entry of the persistently stored log, and then returning a response to the host or other client originating the write I/O operation. At a later point in time, the entry of the recorded write I/O operation can be flushed from the log. The write I/O can write first data or content at a target logical address. Flushing of the logged write I/O can include allocating a physical storage location on a BE PD, and then storing the logged first data or content written by the write I/O from the log to the allocated BE PD physical storage location. Flushing of the logged write I/O can also include creating and/or updating any needed mapping information of the hierarchical MD structure (e.g., such as described in connection with FIGS. 5, and 6A-6C) to map the target logical address to the corresponding physical storage location on the BE PDs storing the first data or content written by the write I/O operation. For example with reference back to FIG. 6C, flushing can include updating the VLB entry 356a to point to the physical storage location storing the first data or content. Consistent with discussion herein, the physical storage location can be included in a PLB, or more specifically, a stripe of a PLB.

Ingest write-bandwidth of many storage systems is limited by the connectivity to its NVRAM devices used for the log. Increasing this write-bandwidth limitation can be accomplished by also writing to other slower devices for logging content written by large writes. The foregoing can introduce several challenges. In at least one embodiment as described herein, an active-active storage system can be an LSS based system including two nodes or two storage controllers where each one such node may serve incoming I/Os concurrently. The system can use a log and log component to record write I/Os. In at least one embodiment, the log component can thus have 2 methods of persisting the write data. One is with a page buffer (PB) which located in the NVRAM persistent storage, and the second one is in a PLB which is 2 MB block, which resides in the BE PDs, such as on an SSD tier of the BE PDs. Consistent with discussion above, a PB in NVRAM persistent storage can be used to record or log content for small write I/Os having an associated write payload less than a maximum size. Alternatively, the PLBs of the log can be used to directly store content or data written by large write I/O operations such as write I/O operations having an associated write data payload equal to or greater than the specified maximum size. To describe the data and associated write I/O operation, a persistent descriptor (PDESC) can also be maintained in the log, where each PDESC for a recorded write I/O operation can include metadata information including the target logical address of the write I/O operation. The PLB tier of the BE PDs can include ubers of storage as described herein. In at least one embodiment, each uber can correspond to 64 GB of consecutive or contiguous storage space on the BE PDs, and each uber can be further divided into to 8 GB sub-units called sub ubers. Thus for large writes, the log component can directly log or record the write I/O data of the log on PLBs of the SSD tier.

In connection with storing or logging the write data of such large write I/Os on the SSD tier, the system can allocate buffers for storing the logged write data from the PLBs of the SSD tier of the BE PDs. Such allocation can be performed in some minimal stripe size granularity of the PLB, where the stripe size can vary with, and be determined by, the RAID parity configuration (e.g., to avoid RMW (read modify write) operations and write each parity and all data of the same stripe only once). Once the logged write data of a write I/O is stored in a PLB of the log, the address of the PLB can be stored in a corresponding PDESC of the logged write I/O operation. Subsequently, the logged write I/O having the write data stored in the PLB can be flushed from the log. Flushing the logged write I/O can include building the mapping information of MD pages which maps the target logical address of the write I/O to a physical location, such as a physical location of the PLB, on the BE PDs storing the write data. Building the mapping information of MD pages for the flushed write I/O of the log can include updating a VLB entry for the target logical address to point to the PLB storing the write data. When flushing (e.g., building the metadata layer of mapping information and specifically the VLBs) logged write data from the stripes of the same PLB, different flushing approaches can be used. In a first approach a flush orchestrator can be utilized where the flush orchestrator can be a single threaded component that orchestrates and partitions the flush work among several worker threads or processes. In a second approach, rather than have a single flush orchestrator coordinate and assign flush work to worker threads, a worker-based flushing approach can be used where each worker thread can independently operate to pull logged write I/O operations and corresponding write data which is flushed from the log. One problem with the flush orchestrator is that there can be dependencies between the logged data to be flushed. Different target logical addresses of multiple logged write I/Os can store logged write data in the same PLB. Thus, two worker threads accessing the same PLB to flush multiple logged write I/Os for different target logical addresses can be in contention where one of the two threads can be blocked. In a similar manner, with worker-based flushing when each worker has some LBA-based granularity and two different workers pull data from different logical address ranges independently but where the different ranges both have corresponding content stored in the same PLB, one worker can be blocked. In general, having the same VLB being updated by two flushers means adding a dependency that will impact flush locality and parallelism and result in synchronizing or serializing access to the single VLB between the two flushers. To overcome the foregoing problems, the techniques of this disclosure can be used in at least one embodiment to spread the available PLB stripes allocations in a way that two independent flushers will not work on stripes from the same PLB.

During the flush process, information regarding the PLBs storing the logged write data can also be updated. In at least one embodiment, the PLBs can have PLB descriptors for their own metadata (e.g., tier ID and PLB state) and, for example, one PLB descriptor page can store more than one PLB's descriptor information. For example, in at least one embodiment, a page can store 32 PLB descriptors. Efficient flush processes can process several PLBs in parallel and introduce another problem of contention of the PLB descriptor page. Multiple flush processes flushing different PLBs can each require exclusive access to the same PLB descriptor and/or same PLB descriptor page and can thus result in serializing access to the PLB descriptor page. The serialization of the flush processes increases the flush latency and thus can result in a reduced overall system performance. To overcome the foregoing problem, the techniques of this disclosure can be used in at least one embodiment to spread the available PLB allocations in a manner that results in a reduction or elimination of parallel flushers accessing the same PLB descriptors page.

In systems with large ingest writes, common expected I/O-related patterns can include sequential write I/O patterns, sequential overwrite patterns and/or sequential delete patterns. With such patterns and with worker-based flushing, each worker pulls data in LBA-based granularity and cannot guarantee to flush all data of same PLB at once since write data or content stored at multiple different LBAs can be stored in the same PLB. As a result, the following several problems can be introduced. One problem which can result is that additional flush overhead can occur as a result of flushing the same PLB several times when the PLB stores content mapped to multiple target logical address. Another problem is that consecutive writes to sequential logical target addresses can result in random reads when the content written by the consecutive writes are stored in buffers of different PLBs which can be physically located at non-consecutive locations in the PLB tier. Additional garbage collection overhead can result because of the non-consecutive LBAs having content written to the same single PLB when such non-consecutive LBAs are subsequently overwritten or deleted. To address these problems, the techniques of the present disclosure in at least one embodiment can add volume-consecutive allocations support for multiple logical addresses which are consecutive, or more generally, all fall in the same specified logical address range or subrange of the same volume or LUN. In at least one embodiment, processing can be performed to maintain a mapping between logical addresses and corresponding PLB stripe allocations storing content or data of the logical addresses. For example, a mapping can store information regarding a first stripe of a PLB storing content of the logical address LA1 written by a first write I/O. LA1 can be expressed as a volume or LUN and LBA or offset within the LUN). A volume LBA range can be expressed and associated with the first stripe allocation of the PLB. The second stripe of the PLB can be temporarily reserved or removed from the list of stripes generally available for allocation. In at least one embodiment, the second stripe of the PLB can be reserved and temporarily only allocated for use in storing content of a logical address within the volume LBA range associated with the PLB and its first stripe. Within some specified window of time or some number of subsequent consecutive allocation, if the system receives a second write I/O writing second content to another logical address LA2 in the same volume LBA range, the system can allocate the second stripe of the PLB for storing the second content. In this manner, there can be locality of reference with respect to logical addresses within the volume LBA range where content stored within a specified window of time at multiple logical addresses in the same volume LBA range can be stored in the same PLB. After the window of time has passed, or a specified number of subsequent write I/Os or PLB storage allocations has occurred, the system can return the second stripe of the PLB to the general PLB stripe allocation list or pool (if the second stripe has not yet been allocated).

In at least one embodiment, the techniques of the present disclosure can be used to provide an efficient structure and process to resolve all the foregoing problems.

The foregoing and other aspects of the techniques of the present disclosure are described in more detail in the following paragraphs.

What will now be described are further details regarding various individual approaches and solutions to solving the different problems noted above. Subsequently, the various approaches and solutions can be considered in combination resulting in a further description of at least one embodiment in accordance with the techniques of the present disclosure.

Generally, the individual approaches and solutions as well as the combined solution utilize techniques of preparing a list of PLB stripes to allocate when ingesting write I/O operations, and thus for storing the content or write data written by such write I/O operations received by the data storage system. Generally, the order in which the PLB stripes are allocated denotes the order in which the write data or content is stored in the log, and also the general order in which the logged write I/Os and associated write data or content of the PLB stripes is flushed from the log. In at least one embodiment, the sub ubers of storage of the PLB tier used for logging write I/O data or content can be used exclusively for this purpose (e.g., used exclusively for the ingest flow of write I/O operations). Thus in at least one embodiment, when an associated large write I/O operation is flushed from the log where the write data is stored in a PLB stripe, the mapping information of MD pages which maps the write's target logical address to the PLB stripe can be constructed and/or updated. For such large write I/Os already having the write data stored on a PLB stripe of the PLB tier of the BE PDs, there is no need to flush the write data from a PB of the NVRAM log storage to BE PDs since the write data is already stored on the BE PDs. Thus for large write I/Os, the mapping information of MD pages can be created and/or updated to map the target logical address of the write I/O operation to the PLB stripe on the BE PDs without further moving or relocating the content written (which is already stored on the BE PDs). The approaches and solutions described below in accordance with the techniques of the present disclosure prepare a list of PLB stripes to allocate where such PLB stripes have an associated allocation order which seeks to reduce and/or eliminate problems discussed above.

In storage systems that support large ingest writes or write I/O operations, the underlying granularity of the writes to the BE PDs can be smaller than the write I/O received from the client. Consistent with other discussion herein, the buffers of the log storing the write data or content can typically be further processed during flushing. As discussed above, flushing in some systems can utilize a flush orchestrator or a worker-based flushing approach. In both such flushing approaches and techniques, write data or content stored in a single PLB can correspond to content mapped to multiple target logical addresses. The multiple target logical addresses can be logically distant from one another in the same LUN or volume's logical address space, and/or located within different logical address spaces of different LUNs or volumes. To maintain the consistency of the data stored in a single PLB, storage systems maintain constrains on the data to be flushed from the same PLB and thus can block simultaneous or parallel flushing of two data buffers within the same PLB. For example, a lock or other synchronization technique can be used per PLB to provide exclusive access to the PLB to a process or thread flushing content from the PLB.

As noted above in at least one embodiment, the available PLBs used for logging write data of large write I/O operations are included in sub ubers used exclusively for the ingest flow of large writes. In at least one embodiment, each sub uber is a consecutive storage space in the SSD storage tier, for example 8 GB of consecutive storage space. In at least one embodiment in accordance with the techniques of the present disclosure, a first approach and solution can be used to spread the available PLB stripe allocations in a way that two independent flushers or flush worker threads do not process content stored stripes from the same PLB. With the first approach and solution, each PLB is partitioned into its multiple stripes. For illustration purposes, following paragraphs consider an embodiment in which each PLB is formed form 2 consecutive stripes. However, more generally, the techniques of the first approach and solution can be generalized for use with any suitable number of consecutive contiguous stripes per PLB. Consider a single sub uber which is 8 GB and contains 4096 PLBs, and where each PLB is 2 MB. Thus, assuming each PLB is partitioned into its two 1 MB stripes, the 1 MB stripes of the one sub uber can be partitioned and ordered such that the first 1 MB stripe of the 4096 PLBs is allocated, and then subsequently, the second 1 MB stripe of the 4096 PLBs is allocated. If PLB stripes are allocated in the foregoing order so that the first 1 MB stripe of all 4096 PLBs are allocated followed by the second 1 MB stripe of all 4096 PLBs, then the distance between two stripes of the same PLB is 4096 stripes or 4 GB. The first approach and solution is described in further detail with reference to FIG. 8.

The following paragraphs use illustrations where various indices are 0-based and thus start at zero. The techniques described in the following paragraphs can be modified in a straightforward manner to also use 1-based indices which start at 1.

Figure 8:
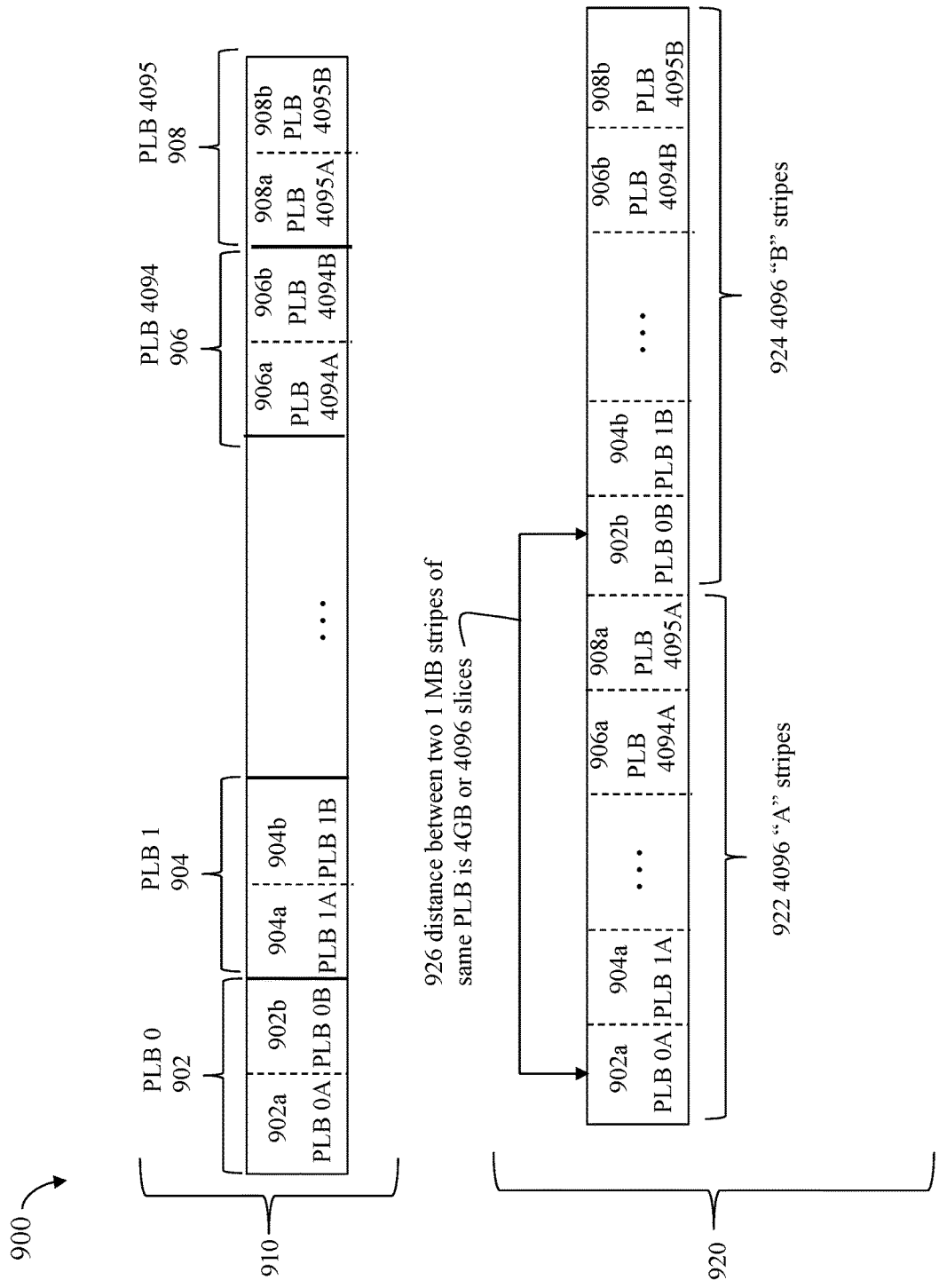
FIGS. 8, 9, 10A-B, 11, 12 and 13 are examples illustrating various approaches and solutions for allocating chunks or stripes of storage in embodiments in accordance with the techniques of the present disclosure.

Referring to FIG. 8, shown is an example 900 illustrating the first approach and solution in at least one embodiment in accordance with the techniques of the present disclosure.

The example 900 includes element 910 denoting a PLB stripe layout in the PLB tier for a single 8 GB sub uber where each PLB=2 MB and each PLB stripe=1 MB, and where the single sub uber includes 4096 PLBs. As noted above, the sub uber is a contiguous or consecutive storage space in the PLB tier having an associated contiguous range of consecutive logical addresses on the PLB tier of the BE PDs. Each PLB can have an associated index "j" denoting its unique consecutive sequential relative order or position within the sub uber, where j has a value between 0 and 4095. The sub uber denoted by 910 includes PLB 0 902, PLB 1 904, . . . PLB 4094 906, and PLB 4095 908. The two stripes of each PLB are represented by a part "A" and a part "B". For example, PLB 902 includes the two stripes PLB 0A (902a) and PLB 0B (902b); PLB 904 includes the two stripes PLB 1A (904a) and PLB 1B (904b); PLB 906 includes the two stripes PLB 4094A (906a) and PLB 4094B (906b); and PLB 909 includes the two stripes PLB 4095A (908a) and PLB 4095B (908b).

In at least one embodiment without the techniques of the present disclosure, the PLB stripes can be allocated in time order based on the consecutive sequential order denoted by the left to right ordering of PLB stripes in the element 910. Rather than allocating PLB stripes as denoted by the order of 910, the techniques of the present disclosure can reorder the PLB stripes to determine a PLB stripe allocation order as represented by the element 920.

The element 920 denotes a list of the PLB stripes of 910 which have an associated order where the part "A" PLB stripe from all 4096 PLBs is first allocated, and then the part "B" PLB stripe from all 4096 PLBs is then allocated. Thus, 920 denotes a consecutive sequential order in which PLB stripes of the sub uber can be allocated as represented by the left to right ordering of the PLB stripes in the element 920. In particular, the element 920 lists the following consecutive sequential order in which the PLB stripes can be allocated: PLB 0A (902a), PLB 1A (904a), . . . PLB 4094A (906a), PLB 4095A (908a), PLB 0B (902b), PLB 1B (904b), . . . PLB 4094B (906b) and PLB 4095B (908b). The distance 926 between the two 1 MB stripes A and B of the same PLB is 4 GB, which holds true for all 4096 PLBs. The element 922 denotes the 4096 A stripes of the 4096 PLBs, and the element 924 denotes the 4096 B stripes of the same 4096 PLBs.

In at least one embodiment, if PLB stripes are allocated in time-order as represented by the element 920, it can be expected that data or content stored in such PLB stripes is flushed in about the same relative time order. Based on this, two flush processes or threads flushing logged writes and associated logged write data stored in the PLB stripes can work in parallel to generally flush the PLB stripes in the order represented by the element 920. It is very unlikely that the two flush processes or threads will simultaneously or in parallel flush content of stripes A and B from the same PLB due to the distance 926 in terms of relative allocation order between stripes of the same PLB.

In other embodiments where each PLB includes more than 2 stripes, the allocation order denoted by 920 can further append, to the end of the allocation list 920, the $3^{rd}$ or part C stripes from all 4096 PLBs, followed by the $4^{th}$ or part D stripes from all 4096 PLBs, and so on, based on the number of stripes per PLB.

Another problem described above is the contention between flushing processes, threads or other code entities of a PLB descriptors page during flush. For example in at least one embodiment, exclusive access to PLB descriptors can be at the page level when updating or writing to a page of PLB descriptors. For illustration purposes, assume the system stores 32 PLB descriptors per page or in a single PLB descriptors page. In this case, it can be desirable for the system to flush in parallel only data from PLBs having associated descriptors in different PLB descriptor pages. In at least one embodiment in accordance with the techniques of the present disclosure, a second approach and solution can be used to spread the available PLB stripe allocations in a way that will reduce or eliminate parallel flushers from accessing the same PLB descriptors page. For illustration purposes, assume a single 8 GB sub uber as described in connection with FIG. 8 which contains 4096 PLBs, where each PLB stores 2 MB of user data. In this case, every 32 consecutive PLBs have corresponding descriptors from the same PLB descriptors page. The second approach and solution in this particular example, for a single sub uber, provides for a PLB allocation order in which the first PLB with a corresponding descriptor in each PLB descriptors page is allocated, then the second PLB with a corresponding descriptor in each PLB descriptors page is allocated, and so on. For a single sub uber that is 8 GB with 4096 PLBs, there are 32 PLB descriptors per page, and there are 128 PLB descriptor pages. Assume the physical layout of the 4096 consecutive PLBs (as in element 910 of FIG. 8) corresponds to the consecutive ordering of the physical layout of 4096 PLB descriptors in 128 PLB descriptor pages of storage. In this case, the techniques of the second approach and solution can select the first 128 PLBs, or stripes thereof, for allocation by selecting the first PLB descriptor of each 128 pages and allocate PLB0, PLB 32, . . . and PLB 4064. Generally, the PLBs selected for allocation in the consecutive order or sequence have a PLB distance of 32 between any 2 consecutively allocated PLBs. The techniques of the second approach and solution can subsequently select the second set of 128 PLBs, or stripes thereof, for allocation by selecting the second PLB descriptor of each 128 pages and allocate PLB1, PLB 33, . . . , and PLB 4065. Generally, the PLBs selected for allocation in the consecutive order or sequence have a PLB distance of 32 between any 2 consecutively allocated PLBs. The techniques of the second approach and solution can select the third set of 128 PLBs, or stripes thereof, for allocation by selecting the third PLB descriptor of each 128 pages and allocate PLB2, PLB 34, . . . , and PLB 4066. Generally, the PLBs and stripes thereof selected for allocation in the consecutive order or sequence have a PLB distance of 32 between any 2 consecutively allocated PLBs. The forgoing can be repeated to select subsequent sets of 128 PLBs for allocation in order. The list denoting the order in which PLBs can be allocated is formed by appending, in consecutive, sequential order, the first set of 128 PLBs, the second set of 128 PLBs, the third set of 128 PLBs, and so on.

The second approach and solution is described in further detail with reference to FIG. 9.

Figure 9:
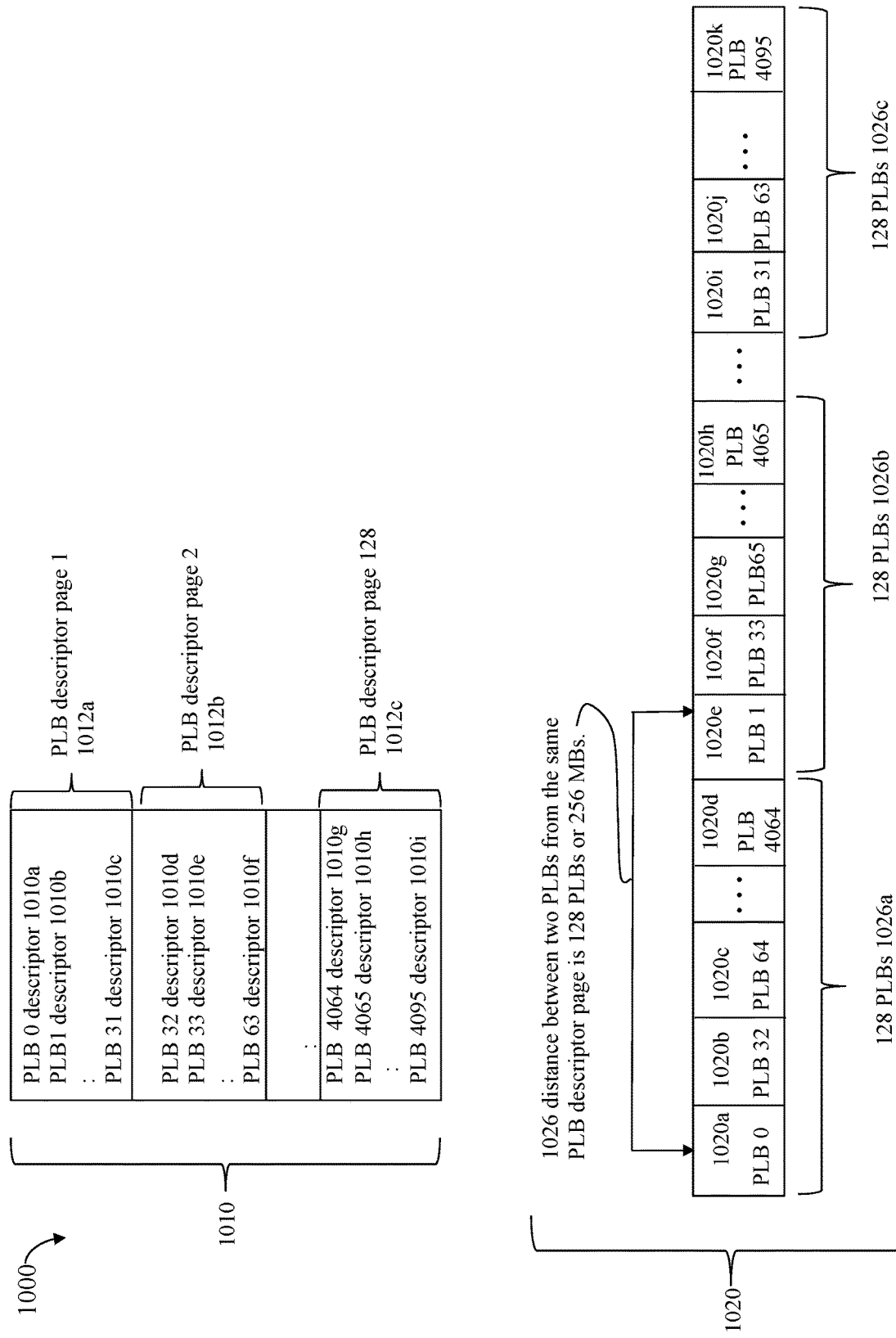

Referring to FIG. 9, shown is an example 1000 illustrating the second approach and solution in at least one embodiment in accordance with the techniques of the present disclosure.

Assume the PLBs have an associated layout on physical storage as described and illustrated in connection with the element 910 of FIG. 8. Additionally, assume that the 128 PLB descriptor pages have an associated layout on physical storage as denoted by the element 1010. Generally, the consecutive order in which the PLBs are located in physical storage as in the layout 910 denotes the consecutive order in which corresponding PLB descriptors can be stored in the 128 PLB descriptor pages 1010. The element 1010 includes 128 PLB descriptor pages which can be stored on physical storage of the BE PDs. PLB descriptor page 1 1012a can store PLB descriptors for PLBs 0-31; PLB descriptor page 2 1012b can store PLB descriptors for PLBs 32-63, . . . and, so on, until the last PLB descriptor page 128 1012c can store PLB descriptors for PLBs 4064-4095.

In accordance with the second approach and solution, the order in which PLBs, and stripes thereof, are allocated can be determined based on the particular PLB descriptors of the 128 pages. In at least one embodiment, processing during the ingest flow can allocate, in consecutive sequential order, the first PLBs having associated descriptors at the $1^{st}$ position in the PLB descriptor pages, the second PLBs having an associated descriptors at the 2nd position in the PLB descriptor pages, and so on, cycling consecutively through all 32 positions across all 128 PLB descriptor pages.

The element 1020 denotes the consecutive sequential order in which the PLBs can be allocated in accordance with the second approach and solution in at least one embodiment. Thus, 1020 denotes a consecutive sequential order in which PLBs of the sub uber can be allocated as represented by the left to right ordering of the PLBs in the element 1020. In this example 1020, for each consecutive sequential 128 PLBs in 1020, the "PLB distance" between any two consecutive PLBs is +32. In particular, the element 1020 lists the following consecutive sequential order in which the PLBs can be allocated: PLB 0 1020*a*, PLB 32 1020*b*, PLB 64 1020*c*, . . . , PLB 4064 1020*d*, PLB 1 1020*e*, PLB 33 1020*f*, PLB 65 1020*g*, . . . , PLB 4065 1020*h*, . . . , PLB 31 1020*i*, PLB 63 1020*j*, . . . , and PLB 4095 1020*k*. The distance 1026 between two PLBs having descriptors in the same PLB descriptors page is 128 PLBs or 256 MBs. The element 1026*a* denotes the first set of 128 PLBs corresponding to the PLBs with descriptors in the $1^{st}$ entries of the 128 PLB descriptor pages 1012*a-c*; the element 1026*b* denotes the second set of 128 PLBs corresponding to the PLBs with descriptors in the $2^{nd}$ entries of the 128 PLB descriptor pages 1012*a-c*; . . . and the element 1026*c* denotes the 128th set of 128 PLBs corresponding to the PLBs with descriptors in the $1^{st}$ entries of the 128 PLB descriptor pages 1012*a-c*. In at least one embodiment, PLBs can be allocated in the consecutive sequential order denoted by the element 1020. Additionally, for each PLB, allocations can be at a stripe level of granularity. Assuming 2 stripes per PLB as discussed above, allocation of PLBj can include first allocating stripe PLBj part A (denoted PLB jA) and then subsequently allocating stripe PLB j part B, (denoted PLB jB).

In at least one embodiment, if PLBs are allocated in time-order as represented by the element 1020, it can be expected that data or content stored in such PLBs is flushed in about the same relative time order. Based on this, two flush processes or threads flushing logged writes and associated logged write data stored in the PLBs can work in parallel to generally flush the PLBs in the order represented by the element 1020. Depending on the rate at which processes or threads flush logged writes and associated PLBs storing the logged write data, it is very unlikely that the two flush processes or threads will simultaneously or in parallel flush content of PLBs having associated descriptors in the same PLB descriptor page.

Other problems described above relate to the occurrence of sequential I/O patterns, or more generally, I/Os such as write I/Os to the same logical address range or portion within a specified amount of time. Due to the architectural design of worker-based flushing in which each worker processes some range of LBAs, worker threads cannot be guaranteed to flush all data of same PLB at once. As discussed above, for example, content written to two different non-sequential logical addresses can be stored in the same PLB. The two different logical addresses can be from the same or different user volumes or LUNs since, for example, allocations can be at the PLB stripe level. As a result, several problems are introduced in connection with sequential I/O patterns as described previously.

In accordance with techniques of the present disclosure in at least one embodiment, a third approach and solution can be used to support volume-consecutive PLB allocations for multiple logical addresses which are consecutive, or more generally, all fall in the same specified logical address range or the same volume LBA range. In at least one embodiment, the volume LBA range can generally be a consecutive contiguous subrange of logical address of a user volume or LUN. For example, consider a system with 1 MB PLB stripe allocations where each PLBs includes 2 stripes denoted respectively as "A" and "B" stripes. In systems with 1 MB PLB stripe allocations, the system can map a logical address LA1 to a PLB j on each 1 MB allocation such as each PLB part A allocation, thereby indicating that content for LA1 is stored at PLB j, part A, and also indicating that the remaining part B stripe of the same PLB j is available for allocation. In at least one embodiment, a hash table can be used to map a logical address to a corresponding PLB storing content of the logical address in an allocated stripe of the corresponding PLB. In at least one embodiment, the hash table can be updated to map the logical address LA1 to the corresponding PLB j when allocating stripe A of PLB j for storing content of LA1 such as for a first write to LA1. LA1 can be included in a volume LBA range denoting a range of consecutive sequential LBAs of the same user volume or LUN. Thus, the hash table can generally map LA1 to a PLB storing content for a volume range or logical address range portion of a LUN.

In this manner in at least one embodiment with 2 stripes A and B per PLB, the existence of a mapping in the hash table for LA1 to PLBj can indicate that stripe A of PLBj has been allocated but stripe B of PLBj is still available for allocation. Thus, the hash table can provide a hint regarding the availability of PLB j stripe B for allocation. In some subsequent time window or subsequent number of allocations subsequent to the first write to LA1, the system can receive a second write I/O which writes second content to LA2, and where LA2 is included in the same volume LBA range associated with PLB j. In response, the system can perform a hash table lookup based on LA2 and determine that the hash table already includes an entry mapping the volume LBA range to PLB j and can then allocate the remaining stripe B of PLB j for storing the second content of LA2. If the system does not receive such a second write I/O to the volume LBA range associated with PLB j, the system can return stripe B of PLB j to the general or main list of stripes available for allocation. In such an embodiment, the stripe B of PLB j can be characterized as temporarily reserved for the specified time period or number of subsequent stripe allocations. During this period of reservation, the stripe B of PLB j can be used and allocated only for storing content of a logical address falling into the volume LBA range associated with PLBj as represented in the hash table. If such a subsequent write I/O writing to a logical address in the volume LBA range associated with PLB j is received during the period of reservation, the remaining stripe B of PLB j can be allocated and used for storing the content written by the subsequent write I/O. Alternatively, if no such subsequent write I/O writing to a logical address in the volume LBA range associated with PLB j is received during the period of reservation, the remaining stripe B of PLB j can subsequently be returned to a main or general list of stripes available for allocation.

In at least one embodiment, the hash table HT can use a logical address LA1 as a key which is mapped by a hash function HF to a corresponding hash value denoting an index or entry E1 of the HT. Thus, more formally, HF(LA1) =E1. Consistent with discussion herein, the logical address LA1 can be expressed using a LUN or volume in combination with an offset or LBA in the logical address space of the LUN or volume. The HT can map the LA1 to a corresponding HT entry E1 or index associated with a PLB.

In at least one embodiment, each PLB can be associated with a logical address range or volume LBA range R1 denoting a portion of multiple consecutive logical addresses of a single LUN or volume. If a first stripe A of the PLB has been allocated for storing content of LA1, then the HT can include a corresponding entry E1 which maps LA1 (which is included in the associated volume LBA range R1) to the PLB, and otherwise, the HT does not include any corresponding entry and mapping. In at least one embodiment, assume the HT includes such an entry E1 and the system receives a write I/O for storing content C2 at logical address LA2 falling within the specified range R1 including LA1. In this case, a lookup or query of the HT indicates that E1 is associated with the PLB and that LA1 and LA2 are both included in the range R1 associated with the PLB (e.g., LA1 and LA2 can be characterized as close in terms of relative logical offsets or addresses of the same LUN or volume), and stripe B of the PLB can be allocated for use in storing content C2 stored at LA2. In this manner, stripes of the same PLB can store content of LA1 and LA2 which fall within the same range R1, where LA1 and LA2 denote logical addresses such as target logical addresses of write operations received relatively close to one another in terms of time (thus have temporal locality) as well as logical addresses which are relatively close to one in the volume or LUN logical address space (and thus have spatial locality).

The third approach and solution is described in further detail with reference to FIGS. 10A, 10B and 10C.

Figure 10A:
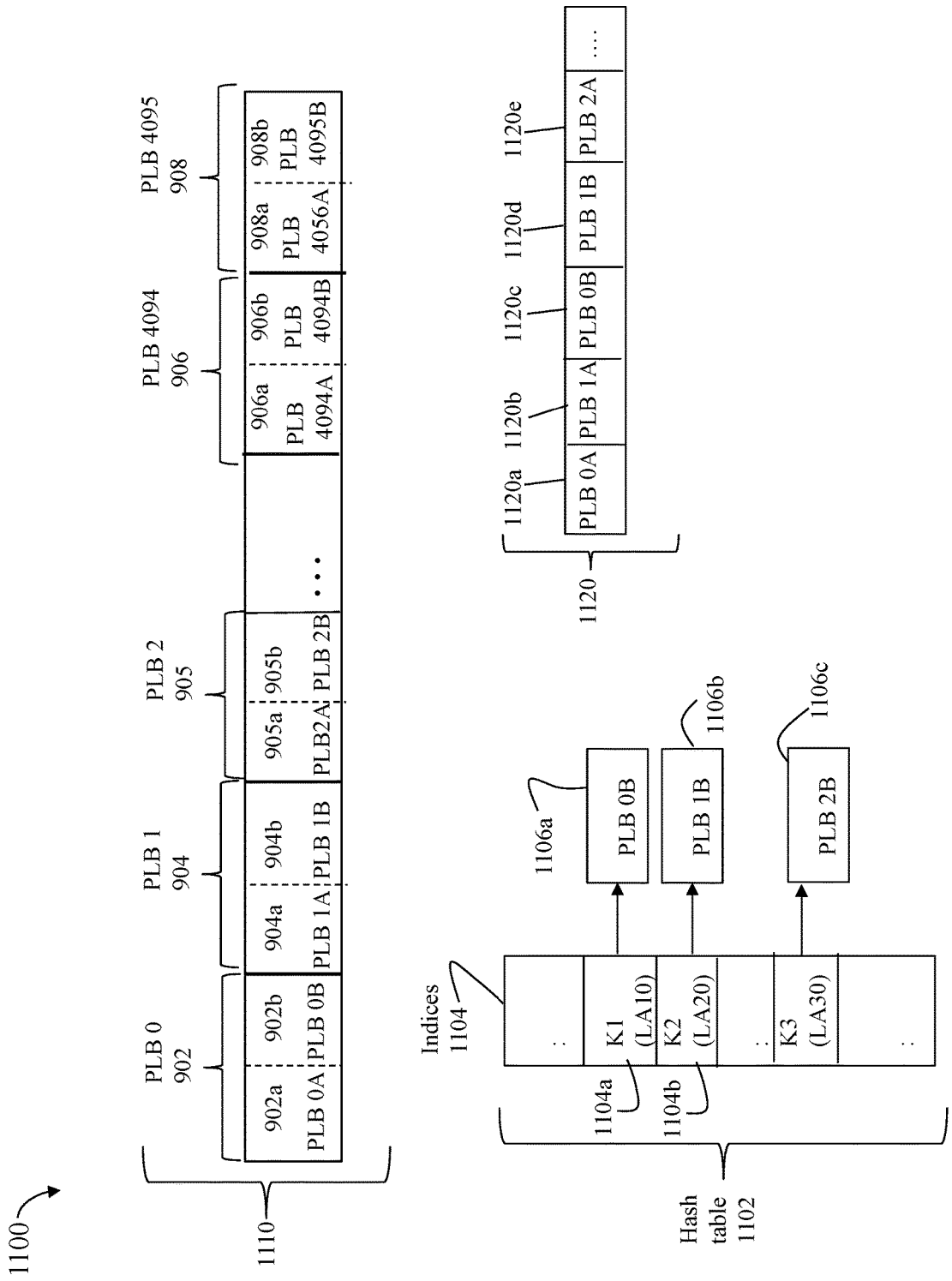

Referring to FIG. 10A, shown is an example 1100 illustrating the third approach and solution in at least one embodiment in accordance with the techniques of the present disclosure.

Assume the PLBs have an associated layout on physical storage as described and illustrated in connection with the element 910 of FIG. 8 reproduced as element 1110 of FIG. 10A for ease of illustration. Additionally, the element 1110 includes further detail regarding PLB 2 905 including stripes PLB 2A 905a and PLB 2B 905b. In other words the elements 1110 and 910 denote the same or corresponding PLB layouts with a difference that element 1110 further identifies PLB 2 905 of the consecutively stored PLBs for use in the example 1110 for the third approach and solution in accordance with the techniques of the present disclosure.

PLB stripes can be allocated for storing content written to user logical addresses in a consecutive sequential order denoted by the element 1110 from left to right in an embodiment not in accordance with the techniques of the present disclosure.

In an embodiment in accordance with the techniques of the present disclosure, the left to right consecutive sequential ordering of the PLB stripes of 1110 can denote a main or general list of stripes available for allocation at a first point in time T1. Generally, PLB stripes can be allocated in the order denoted by 1110 where the A stripe of a PLB, when allocated can additionally result in temporarily reserving or removing the B stripe of the PLB from the general list 1110 for at most a specified time period or a maximum number of subsequent PLB stripe allocations. Assume the A stripe of the PLB is allocated for storing content of logical address LA10. During this period of reservation or removal from the general list 1110, the B stripe can be allocated only for storing write data written to a second logical address LA11 which is within the same volume LBA range as LA10. If no such write is received which writes to LA11 within the period of reservation or removal, the B stripe can be returned to the main or general list of stripes available for allocation. The foregoing is described in more detail below.

The hash table 1102 can have various associated mappings between logical addresses and PLBs at various points in time discussed in more detail below.

At the time T1, the hash table 1102 can be empty. The indices 1104 can denote the hash table index values. At a second point in time T2 subsequent to T1, a first write I/O W1 can be received which writes first content C1 to a target logical address LA10. At T2, there are no entries in the hash table 1102 so there is no existing entry having an associated logical address which is within the same volume LBA range as LA10. Processing can allocate the next PLB stripe 0A 902a for storing C1 and then store a corresponding entry in the hash table 1102 for LA10 which is associated with PLB 0 902. In this example, LA10 can result in a hash value corresponding to the hash table entry or index K1 1104a which is associated with the PLB 0B 1106a. Thus, element 1106a indicates that the PLB stripe 0B (902b) is reserved and removed from the main allocation list 1110. After allocation of PLB stripe 0A 902a and removing PLB stripe 0B 902b from the main list 1110, the PLB stripe 1A 904a can be identified as the next available stripe of the main list 1110 available for allocation.

At a third point in time T3 subsequent to T2, a second write I/O W2 can be received which writes second content C2 to target logical address LA 20. LA20 can result in a hash value corresponding to the hash table entry or index K2. At T3, there is no existing entry having an associated logical address which is within the same volume LBA range as LA20. As a result, processing can allocate the next PLB stripe 1A 904a for storing C2 and then store a corresponding entry in the hash table 1102 for LA20 which is associated with PLB 1 904. In this example, LA20 can result in a hash value corresponding to the hash table entry or index K2 1104b which is associated with the PLB 1B 1106b. Thus, element 1106b indicates that the PLB stripe 1B (904b) is reserved and removed from the main allocation list 1110. After allocation of PLB stripe 1A 904a and removing PLB stripe 1B 904b from the main list 1110, the PLB stripe 2A 905a can be identified as the next available stripe of the main list 1110 available for allocation.

At a fourth point in time T4 subsequent to T3, a third write I/O W3 can be received which writes third content C3 to target logical address LA11. Processing can determine that the existing entry K1 1104a is associated with logical address LA10 and that LA10 and LA11 are included in the same volume LBA range. For example, LA10 and LA11 can be consecutive sequential logical addresses of the same user volume or LUN. More generally, LA10 and LA11 can be included in the same volume LBA range denoting a consecutive contiguous logical address subrange of the same user volume or LUN's logical address space. In this case, processing can locate the entry K1 1104a and allocate the PLB stripe 0B 1106a for storing C3. PLB 0B (902b) denoted by 1106a can be removed from the hash table 1102 once allocated.

At a fifth point in time T5 subsequent to T4, a fourth write I/O W4 can be received which writes fourth content C4 to target logical address LA21. Processing can determine that the existing entry K2 1104b is associated with logical address LA20 and that LA20 and LA21 are included in the same volume LBA range. For example, LA20 and LA21 can be consecutive sequential logical addresses of the same user volume or LUN. More generally, LA20 and LA21 can be included in the same consecutive contiguous logical address subrange of the same user volume or LUN's logical address space. In this case, processing can locate the entry K2 1104b and allocate the PLB stripe 1B 1106b for storing C4. PLB 1B (904b) denoted by 1106b can be removed from the hash table 1102 once allocated. Thus, after allocating PLB stripe 1B 1106b, the hash table 1102 can be empty and not include any associated or mapped PLBs.

At a sixth point in time T6 subsequent to T5, a fifth write I/O W5 can be received which writes fifth content C5 to target logical address LA 30. LA30 can result in a hash value corresponding to the hash table entry or index K3. At T6, there is no existing entry having an associated logical address which is within the same volume LBA range as LA30. As a result, processing can allocate the next PLB stripe 2A 905a for storing C5 and then store a corresponding entry in the hash table 1102 for LA30 which is associated with PLB2 905. In this example, LA30 can result in a hash value corresponding to the hash table entry or index K3 1104c which is associated with the PLB 2B 1106c. Thus, element 1106c indicates that the PLB stripe 2B (906b) is reserved and removed from the main allocation list 1110.

Processing of subsequently ingested or received write I/Os can proceed as generally described above. The element 1120 indicates the order in which PLB stripes are allocated in connection with the example 1100 of FIG. 10A discussed above. Referring to FIG. 10B, shown is an example 1101 of the state of the hash table 1102 after processing W5 received at T6.

Figure 10B:
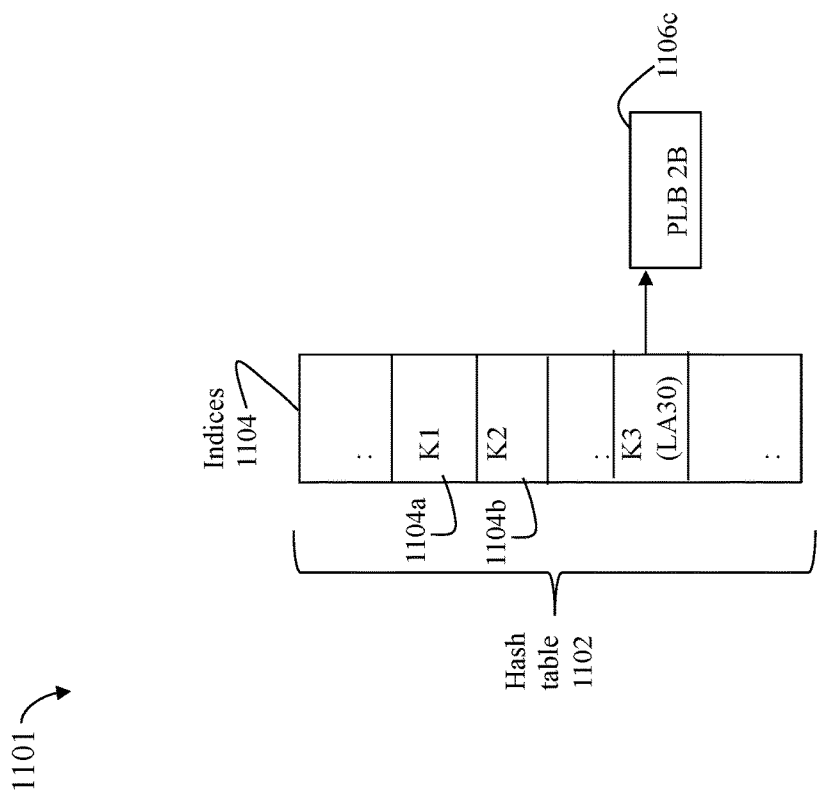
Figure 10C:
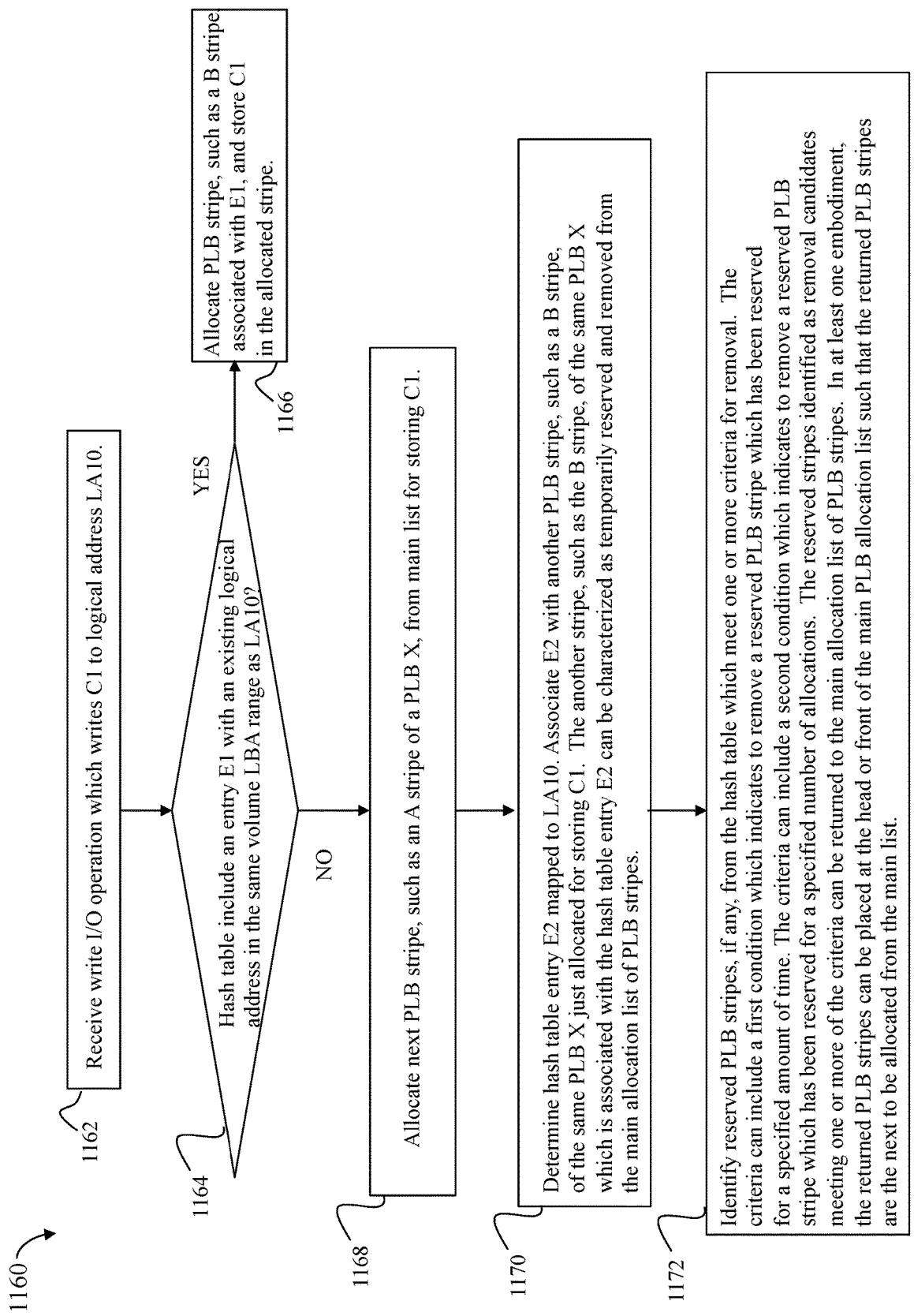
FIGS. 10C and 14 are flowcharts or processing steps that can be performed in various embodiments in accordance with the techniques of the present disclosure.

Referring to FIG. 10C, shown is a flowchart 1160 of processing steps that can be performed in at least one embodiment in accordance with the techniques of the present disclosure. The flowchart 1160 summarizes processing described above in connection with the third approach and solution such as in connection with FIGS. 10A and 10B.

At the step 1162, a write I/O which writes content C1 to logical address LA10 can be received at the data storage system. The write I/O can be a large write I/O having an associated write data payload above a specified size so that the write I/O is characterized as "large" and the content written can be directly stored on a PLB stripe of the BE PDs. Consistent with other discussion herein with an LSS-based system, the write I/O can be persistently recorded in a log with a PDESC which points to the PLB stripe storing the logged write I/O data payload or content. Subsequent steps (e.g., 1166 and 1168) of the flowchart 1160 include allocating the PLB stripe used to store the write I/O content as part of logging or recording the write I/O in the log. From the step 1162, control proceeds to the step 1164.

At the step 1164, processing is performed to determine whether the hash table includes an entry E1 associated with an existing logical address in the same volume LBA range as LA10. If the step 1164 evaluates to yes, control proceeds to the step 1166. At the step 1166, processing is performed to allocate the PLB stripe, such as a B stripe, associated with E1, and then store C1 in the allocated PLB stripe. If the step 1164 evaluates to no, control proceeds to the step 1168.

At the step 1168, processing is performed to allocate the next PLB stripe, such as a next A stripe of the next PLB X, from the main list for storing C1. From the step 1168, control proceeds to the step 1170.

At the step 1170, processing is performed to map, using the hash table, the logical address LA10 to the PLB X and provide a hint that another stripe of PLB X is available for allocation. The step 1170 can determine a hash table entry E2 mapped to LA10. The entry E2 can be associated with another PLB stripe, such as a B stripe, of the same PLB X just allocated in the step 1168 for storing C1. The another stripe, such as the B stripe, of the same PLB X which is associated with the hash table entry E2 can be characterized as temporarily reserved and removed from the main allocation list of PLB stripes. The another stripe, such as the B stripe, of the same PLB X which is associated with the hash table entry E2 can be identified and associated with the hash table entry E2 as a reserved stripe available for allocation for storing content of another logical address in the same volume LBA range as LA10. From the step 1170, control proceeds to the step 1172.

At the step 1172, processing can be performed to identify reserved PLB stripes, if any, from the hash table which meet one or more criteria for removal and thus can be returned to the main list. The criteria can include a first condition which indicates to remove a reserved PLB stripe which has been reserved for a specified amount of time. The criteria can include a second condition which indicates to remove a reserved PLB stripe which has been reserved for a specified number of allocations. The fact that a PLB stripe having a corresponding volume LBA range has been reserved but not allocated within the specified amount of time, or reserved but not allocated within a specified number of allocations indicates that generally no write has been recently received or ingested which writes to a logical address in the corresponding volume LBA range. The reserved stripes identified as removal candidates meeting one or more of the criteria can be returned to the main allocation list of PLB stripes. In at least one embodiment, the returned PLB stripes can be placed at the head or front of the main PLB allocation list such that the returned PLB stripes are the next to be allocated from the main list.

Generally, the step 1172 can use any suitable condition(s) or criteria to determine when one or more reserved PLB stripes are removed from the hash table. As a variation to the above in at least one embodiment, all reserved PLB stripes of the hash table can be removed and returned to the main list, such as the head of the main list, after a specified amount of time has passed and/or after a specified number of PLB stripes have been allocated. In this latter case, the hash table can be effectively periodically cleared of all PLB stripes at each occurrence of the specified amount of time passing and/or after each occurrence of a specified number of PLB stripes being allocated.

It should be noted that the foregoing description in connection with FIGS. 10A-10C is made with reference to an embodiment in which each PLB can be formed from 21 MB stripes. More generally as noted elsewhere herein, a PLB can include 2 or more stripes. In embodiments where a PLB includes more than 2 stripes, the hash table can store information identifying the particular one or more stripes of the PLB which are available for allocation or unallocated. For example, if a PLB is formed from 8 stripes, and a single 1 of the 8 stripes is allocated for storing write data with 7 stripes remaining available for allocation, the step 1170 of FIG. 10C can identify the 7 stripes which are reserved and available for allocation. If a subsequent logical address falls into the volume LBA range associated with the PLB, another of the 7 available stripes can be allocated and the hash table updated to now only identify the remaining 6 unallocated stripes of the PLB associated with the volume LBA range. Generally, any suitable structure or technique can be used to identify the particular stripes of a PLB which are allocated and which are unallocated. For example in at least one embodiment in which a PLB includes more than 2 stripes, a bitmap or bit vector can be used to identify which stripes of the PLB are allocated and which are unallocated. For example, each stripe of the PLB can have a corresponding bit value in the bitmap or vector, where a bit value=1 means the corresponding stripe is allocated and a bit value=1 means the corresponding stripe is available or unallocated.

It should be noted that although a hash table is used in connection with implementing the mappings between logical addresses, PLBs storing content of the logical addresses, and associated volume LBA ranges, more generally any suitable structure(s) and technique(s) can be used to implement the mappings.

What will now be described is an aggregated or combined approach and complete solution in at least one embodiment based on the foregoing three approaches and solutions discussed above. The combined approach and solution discussed below is based on an embodiment using two sub ubers as discussed above where each sub uber can denote a contiguous consecutive portion of storage and, in particular, where each sub uber is 8 GB (in terms of user data storage capacity), each sub uber is formed from 4096 PLBs, each PLB is formed from two 1 MB stripes, and there are 32 PLB descriptors per page.

Figure 11:
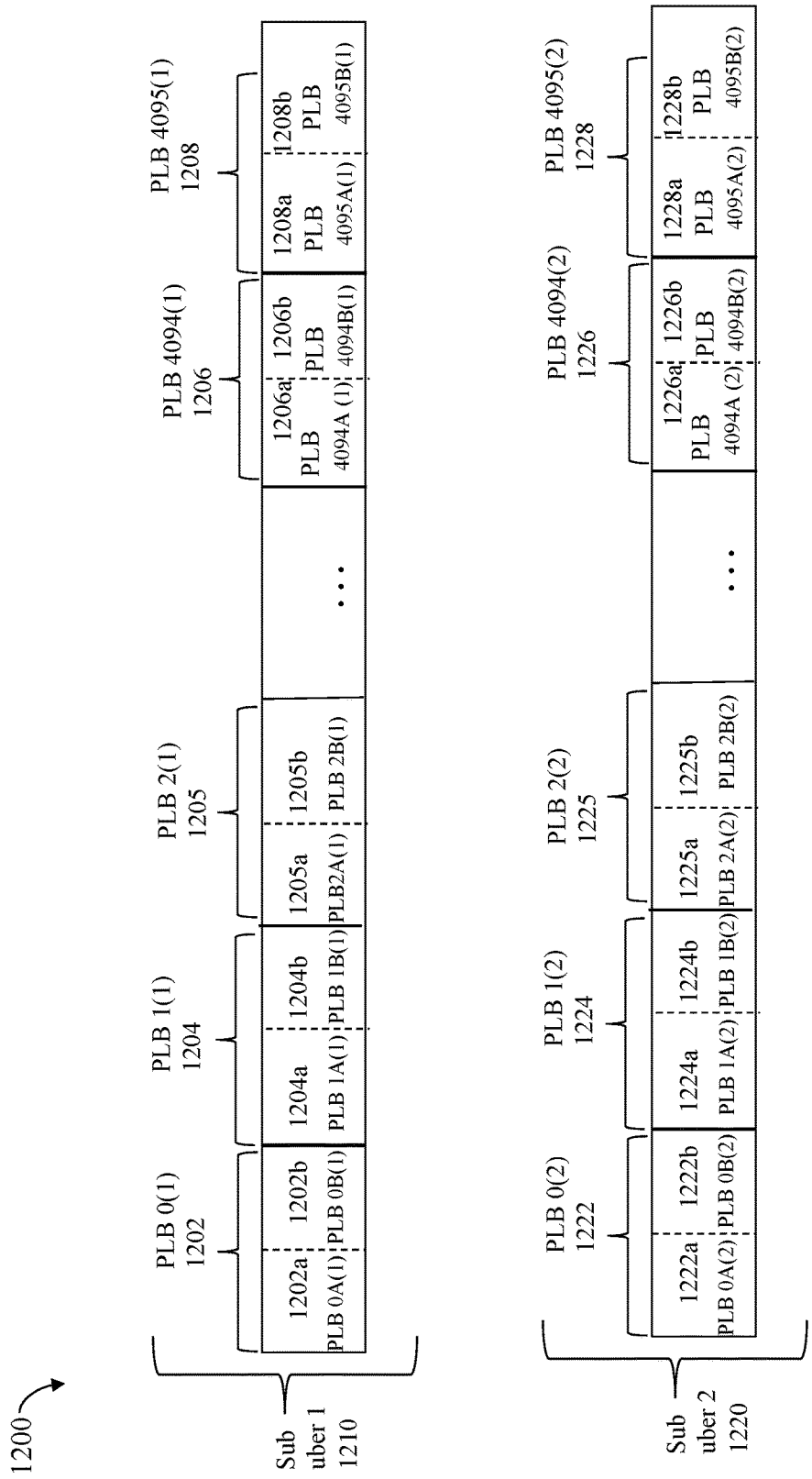

Referring to FIG. 11, shown is an example 1200 illustrating the layout of the PLBs of the two sub ubers 1210 and 1220 in at least one embodiment in accordance with the techniques of the present disclosure.

PLBs of a sub uber can be identified using a PLB index and associated stripes A and B as discussed above. Additionally, in this embodiment of the combined approach using two sub ubers 1210 and 1220, further notation can be used to denote a particular PLB and PLB stripe of a particular sub uber. Sub uber 1210 is identified as the first sub uber or sub uber "1", and sub uber 1220 is identified as the second sub uber or sub uber "2". Building on the PLB notation discussed above, a PLB and its stripes can be denoted as belonging to a particular one of the two sub ubers 1210, 1220 based on an appended notation of "(k)", where "k" has a value of 1 or 2 identifying the particular sub uber to which a PLB belongs. To further illustrate, the sub uber 1, 1210 includes: PLB 0(1) 1202 comprising the PLB stripes PLB 0A(1) 1202a and PLB 0B(1) 1202b; PLB 1(1) 1204 comprising PLB stripes PLB 1A(1) 1204a and PLB 1B(1) 1204b; PLB 2(1) 1205 comprising PLB stripes PLB 2A(1) 1205a and PLB 2B(1) 1205b; . . . PLB 4094(1) 1206 comprising PLB stripes PLB 4094A(1) 1206a and PLB 4094B(1) 1206b; and PLB 4095(1) 1208 comprising PLB stripes PLB 4095A(1) 1208a and PLB 4095B(1) 1208b. Additionally, the sub uber 2, 1220 includes: PLB 0(2) 1222 comprising the PLB stripes PLB 0A(2) 1222a and PLB 0B(2) 1222b; PLB 1(2) 1224 comprising PLB stripes PLB 1A(2) 1224a and PLB 1B(2) 1224b; PLB 2(2) 1225 comprising PLB stripes PLB 2A(2) 1225a and PLB 2B(2) 1225b; . . . PLB 4094(2) 1226 comprising PLB stripes PLB 4294A(2) 1226a and PLB 4094B(2) 1226b; and PLB 4095 (2) 1228 comprising PLB stripes PLB 4095A(2) 1228a and PLB 4095B(2) 1228b.

In a first step S1, processing can initialize 64 empty lists. The 64 lists in this embodiment can generally denote two sets of lists where each of the two sets of lists includes 32 lists. The first set of 32 lists can be used for storing or identifying the first 1 MB stripe or the A stripe of each PLB across all PLBs of the sub ubers 1210 and 1220. The second set of 32 lists can be used for storing or identifying the second 1 MB stripe or the B stripe of each PLB across all PLBs of the sub ubers 1210 and 1220. Thus, each of the two sets of lists identifies 1 MB chunks or stripes of storage collectively denoting 8 GB of storage. Each of the 64 lists in this example can include 256 entries or elements, where each such entry or element corresponds to a single 1 MB chunk or stripe of storage. The lists can be constructed in a step S3 discussed below in more detail.

Subsequent to the step S1, a second step S2 can be performed. The step S2 can include initializing an empty hash table and initializing a counter, HT counter to zero. HT counter can be updated and incremented by 1 for each 1 MB chunk or stripe allocated. As discussed below, when HT counter reaches a predefined threshold T1, any reserved stripes included in, or identified by, entries of the hash table can be unreserved or removed from the hash table and returned to the main allocation list.

Following the step S2, the step S3 can be performed to form the 64 lists. In at least one embodiment, each of the 64 lists can have an associated list index L. For example, each of the 64 lists can have a unique list index L which is an integer value included in the inclusive range, $0 \leq L \leq 63$. The step S3 include the substep S3a and the substep S3b. The substep S3a can include processing to populate or form a first set of lists having associated L values between 0-31. The substep S3b can include processing to populate or form a second set lists having associated L values between 32-63.

In the substep S3a, for each PLB of each sub uber, the first or A stripe of the PLB is added to one of the lists 0-31 having an associated list index L=PLB index j modulo 32. In at least one embodiment, each of the lists 0-31 can have an associated list index L which includes as elements or entries all PLB A stripes having an associated PLB index j which results in L=(PLB index j modulo 32). The first set of lists 0-31 contains one list corresponding to each of the possible 32 resulting values of the PLB index j modulo 32. Modulo denotes a modulus or modulo operation which returns the remainder or signed remainder of a division, after one number is divided by another. Given two positive numbers J1 and J2, "J1 modulo J2" is the remainder of the Euclidean division of J1 by J2, where J1 is the dividend and J2 is the divisor. As used herein, the PLB index j modulo 32 denotes the remainder after "j" is divided by 32. It should be noted that the foregoing can be generalized as PLB index j modulo N, where N denotes the number of PLB descriptors stored per page.

To further illustrate in connection with the substep S3a, the first set of 32 lists can have a unique list index L which is an integer value included in the inclusive range, $0 < L < 31$. PLB stripe 0A(1) 1202a has an associated PLB index j=0, where "0 modulo 32" is 0. Thus, the PLB stripe 0A(1) is included in the list 0. PLB stripe 1A(1) 1204a has an associated PLB index j=1, where "1 modulo 32" is 1. Thus, the PLB stripe 1A(1) is included in the list 1. PLB stripe 4094A(1) 1206a has an associated PLB index j=4094, where "4094 modulo 32" is 30. Thus, the PLB stripe 4094A(1) is included in the list 30. PLB stripe 4095A(1) 1208a has an associated PLB index j=4095, where "4095 modulo 32" is 31. Thus, the PLB stripe 4095A(1) is included in the list 31. PLB stripe 0A(2) 1222a has an associated PLB index j=0, where "0 modulo 32" is 0. Thus, the PLB stripe 0A(2) is included in the list 0. PLB stripe 1A(2) 1224a has an associated PLB index j=1, where "1 modulo 32" is 1. Thus, the PLB stripe 1A(2) is included in the list 1. PLB stripe 4094A(2) 1226a has an associated PLB index j=4094, where "4094 modulo 32" is 30. Thus, the PLB stripe 4094A(2) is included in the list 30. PLB stripe 4095A(2) 1228a has an associated PLB index j=4095, where "4095 modulo 32" is 31. Thus, the PLB stripe 4095A(2) is included in the list 31.

In the substep S3b, for each PLB of each sub uber, the second or B stripe of the PLB is added to one of the lists 32-63 having an associated list index L=32+(PLB index j modulo 32). In at least one embodiment, each of the lists 32-63 can have an associated list index L which includes as elements or entries all PLB B stripes having an associated PLB index j which results in L=32+(PLB index j modulo 32). The second set of lists 32-63 contains one list corresponding to each of the possible 32 resulting values of "32+(PLB index j modulo 32). It should be noted that the foregoing can be generalized as 32+(PLB index j modulo N), where N denotes the number of PLB descriptors stored per page.

In at least one embodiment, the lists in each set can be further ordered by the result of the above-noted modulo operation. In at least one embodiment, within each list, elements or stripes of the list can be ordered based on increasing values of "k", the sub uber identifier (ID), and also ordered based on increasing values of the PLB index j of each element or stripe. In at least one embodiment, "k" can be used a primary or first key for ordering elements in each list and "j" can be used a secondary or second key for ordering elements in each list.

Figure 12:
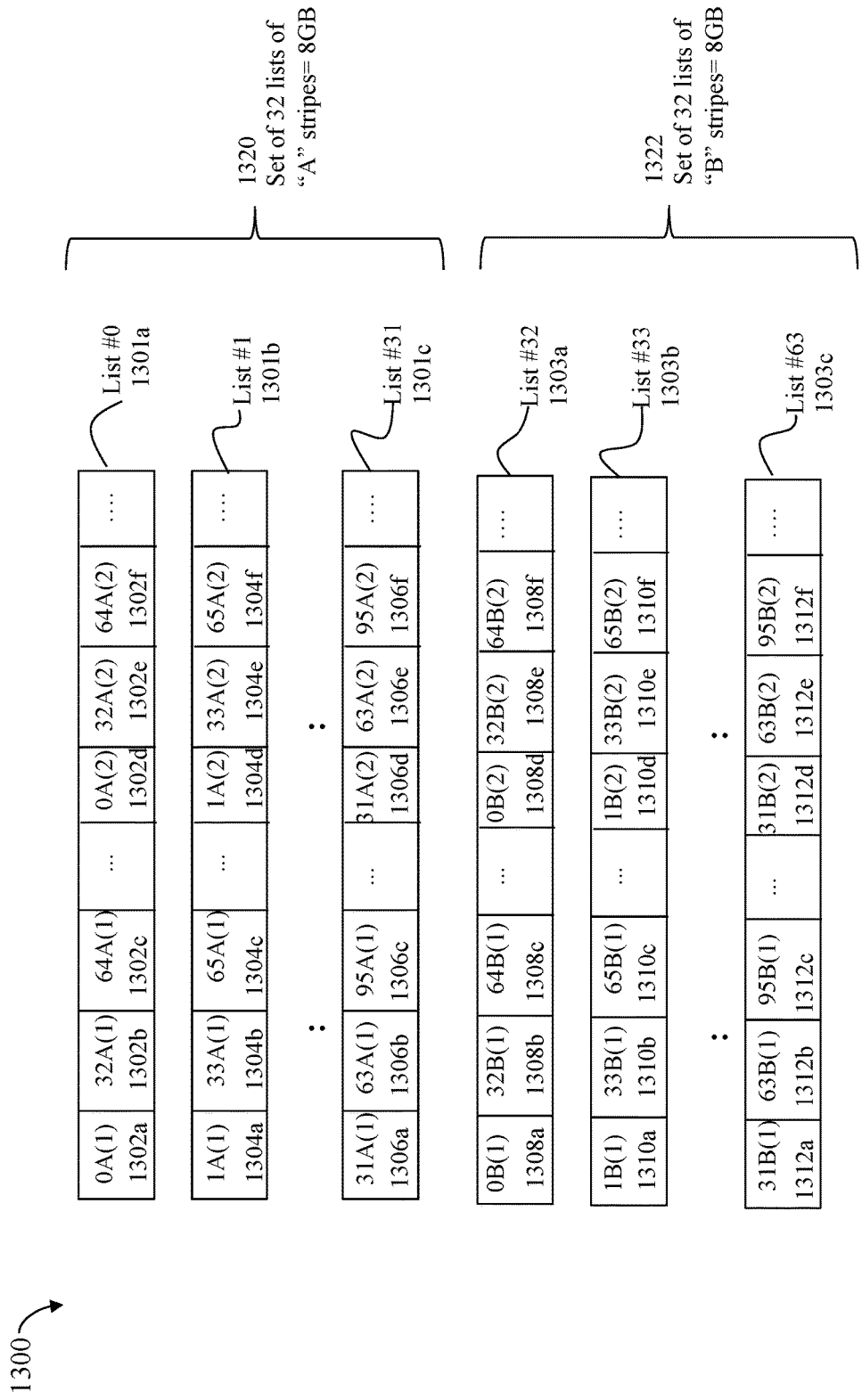

Referring to FIG. 12, shown is an example 1300 illustrating the resulting 64 lists populated as described by processing of the step S3.

In particular, the element 1320 denotes the first set of lists 0-31 populated by the processing of substep S3a; and the element 1322 denotes the second set of lists 32-63 populated by the processing of substep S3b. Each of the sets 1320, 1322 include stripes totaling 8 GB of storage.

Consistent with the discussion above regarding the step S3a, the list 0 1301a includes the following A stripes in the following consecutive sequential order: PLB 0A(1) 1302a, PLB 32A(1) 1302b, PLB 64A(1) 1302c, . . . PLB 0A(2) 1302d, PLB 32A(2) 1302e, PLB 64A(2) 1302f, and so on. The list 1 1301b includes the following A stripes in the following consecutive sequential order: PLB 1A(1) 1304a, PLB 33A(1) 1304b, PLB 65A(1) 1304c, . . . PLB 1A(2) 1304d, PLB 33A(2) 1304e, PLB 65A(2) 1304f, and so on. The list 31 1301c includes the following A stripes in the following consecutive sequential order: PLB 31A(1) 1306a, PLB 63A(1) 1306b, PLB 95A(1) 1306c, . . . PLB 31A(2) 1306d, PLB 63A(2) 1306e, PLB 95A(2) 1306f, and so on.

Consistent with the discussion above regarding the step S3b, the list 32 1308a includes the following B stripes in the following consecutive sequential order: PLB 0B(1) 1308a, PLB 32B(1) 1308b, PLB 64B(1) 1308c, . . . PLB 0B(2) 1308d, PLB 32B(2) 1308e, PLB 64B(2) 1308f, and so on. The list 33 1303b includes the following B stripes in the following consecutive sequential order: PLB 1B(1) 1310a, PLB 33B(1) 1310b, PLB 65B(1) 1310c, . . . PLB 1B(2) 1310d, PLB 33B(2) 1310e, PLB 65B(2) 1310f, and so on. The list 63 1301c includes the following B stripes in the following consecutive sequential order: PLB 31B(1) 1312a, PLB 63B(1) 1312b, PLB 95B(1) 1312c, . . . PLB 31B(2) 1312d, PLB 63B(2) 1312e, PLB 95B(2) 1312f, and so on.

Consistent with the discussion above, each of the 64 lists of FIG. 12 has a corresponding unique one of the possible L values between 0 and 63, inclusively, which includes stripes of PLBs placed on particular lists in the substeps S3a and S3b. As noted above, each of the two sets of lists include 32 lists where 32 corresponds to N denoting the number of PLB descriptors stored per page. Thus more generally, each of the two sets of lists can include N lists for a total of 2*N lists. Furthermore, in this example, each list includes 256 elements or entries corresponding to 256 1 MB stripes or chunks. In this example there are 128 pages of PLB descriptors per sub uber and thus a total of 256 pages of PLB descriptors. Each element or stripe in the same list L is associated with a unique page of PLB descriptors. More generally, each list can include "Q1*Q2" entries or stripes, where Q1 denotes the number of sub ubers, and Q2 denotes the number of pages of PLB descriptors per sub uber. The foregoing example includes 64 lists or 2 sets of 32 lists which can be expressed as M*N, where M denotes the number of chunks or stripes of each PLB, and N denotes the number of PLB descriptors per page.

Following the step S3, a step S4 can be performed to form the main allocation list (sometimes referred to as the main or general list). The step S4 can include concatenating or appending the lists 0 through 63 in consecutive sequential order to form the main list. More generally, the step S4 can include concatenating or appending the lists 0 through 63 in consecutive order to the tail of any existing main list. Additionally elements of each list can be added in consecutive sequential order as denoted by the left to right ordering of each of the lists 0 through 63 in FIG. 12. In such an embodiment, allocations can be made from the main list, in consecutive order, from head to tail. The step S4 can include concatenating or appending the lists 0-63 of FIG. 12 to the existing main list so that elements of list 0 1301a are added or appended, from left to right consecutively, to the main list. Subsequently, the elements of list 1 1301b are added or appended from left to right consecutively, to the main list. The foregoing is repeated for each of the lists 0-63 ending with processing which appends or adds the elements of list 63 1303c, from left to right consecutively, to the main list.

Thus, the foregoing is based on an aggregate approach using two sub ubers which can generally be further scaled in a straightforward manner for use with any suitable number of 2 or more sub ubers, any suitable number of PLB descriptors stored per page, and any suitable number of stripes or chunks per PLB.

Figure 13:
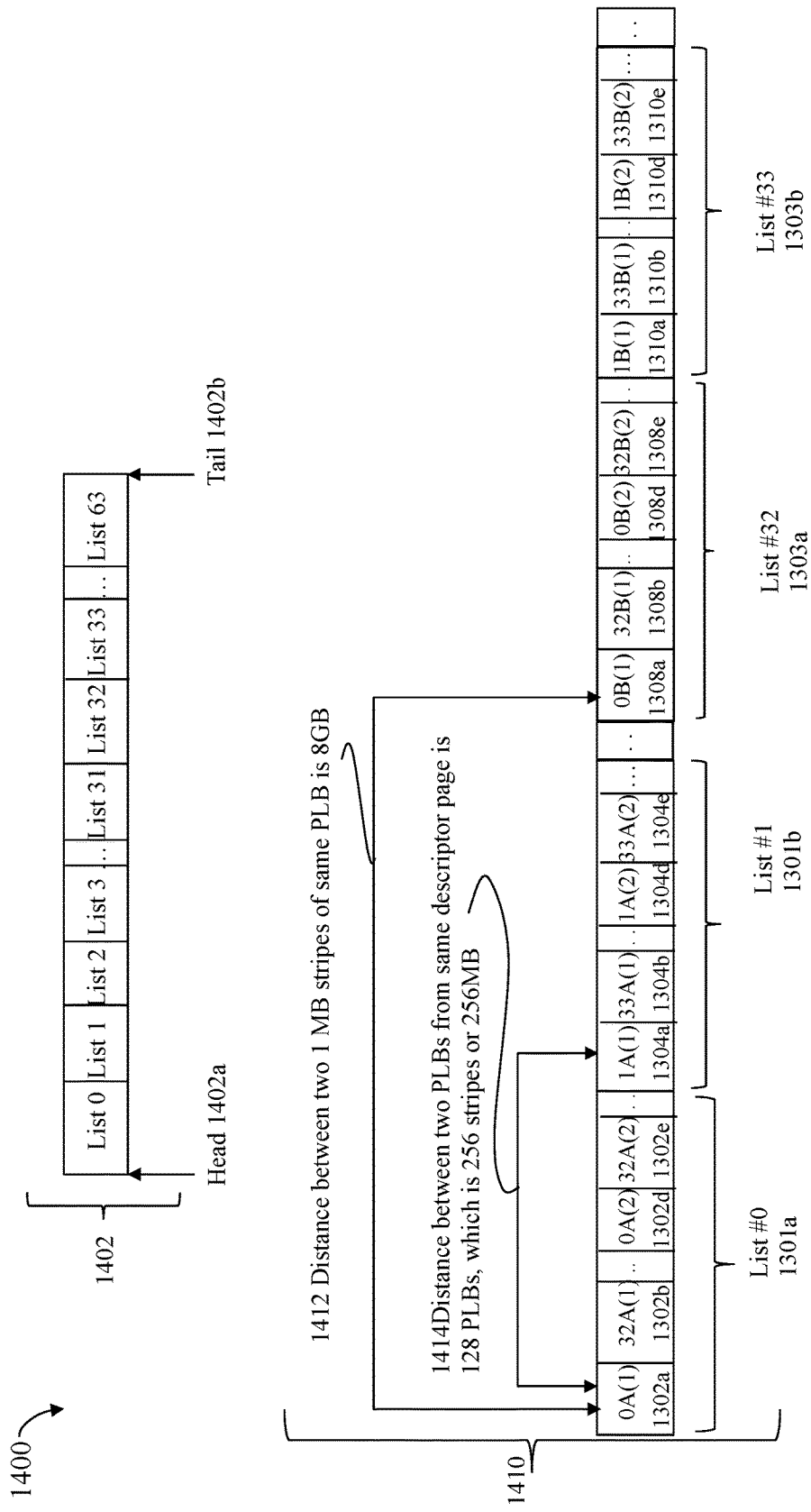

Referring to FIG. 13, shown is an example 1400 illustrating further detail regarding the result of performing the step S4 in at least one embodiment in accordance with the techniques of the present disclosure.

The element 1402 generally represents the aggregated or combined list resulting from concatenating or appending the 64 lists of FIG. 12 in consecutive sequential order based on increasing list index values L. Additionally, the combined lists 1402 can be further appended or added to the tail or end of any existing main list. Otherwise, if there is no such existing main list, the element 1402 denotes the main list and left to right consecutive sequential allocation ordering of PLB stripes. Stripes or chunks can be allocated consecutively and sequentially from the head 1402a of the list 1402 to the tail 1402b of the list 1402. Generally, the processing described above in connection with the step S3 and S4 partitioned the storage chunks or stripes of two sub ubers among 64 lists, and then further combines or concatenates the 64 lists into one main list used in connection with chunk or stripe allocation.

The element 1410 illustrates in further detail the individual chunks or PLB stripes of the combined main list generally denoted by the element 1402. As illustrated by 1410, the lists 0-63 are appended in increasing list index values of L. In at least one embodiment, the lists in each set can be further ordered by the result of the above-noted modulo operation. In at least one embodiment, within each list, elements or stripes of the list can be ordered based on increasing values of "k", the sub uber identifier (ID), and also ordered based on increasing values of the PLB index j of each element or stripe. In at least one embodiment, "k" can be used a primary or first key for ordering elements in each list and "j" can be used a secondary or second key for ordering elements in each list. For example, reference is made to list 0 1301a including elements or entries sorted in increasing order of based on values of "k" as the primary key and sorted in increasing order based on values of "j" as the secondary key. Based on the foregoing, the list 0 1301*a* can first include elements or A stripes of sub uber 1 followed by elements or A stripes of sub uber 2. Within those elements or A stripes of sub uber 1, such elements or A stripes of sub uber 1 can be further sorted based on increasing order of PLB index values j, as denoted beginning with 1302*a*, 1302*b*, and so on. Within those elements or A stripes of sub uber 2, such elements or A stripes of sub uber 2 can be further sorted based on increasing order of PLB index values j, as denoted beginning with 1302*d*, 1302*e*, and so on.

In at least one embodiment, the processing of the above-noted steps S1, S2, S3 and S4 can be repeated for each new set of two sub ubers used in connection with the techniques of the present disclosure with the combined approach and solution. Thus the foregoing processing steps S1, S2, S3 and S4 prepare and maintain a main list denoting a consecutive sequential order in which chunks or stripes of PLBs can be allocated.

Based on allocations made in an order in accordance with the main list 1410, the element 1412 denotes a first invariant in that the distance between two 1 MB stripes of the same PLB, for any PLB, is 8 GB; and the element 1414 denotes a second invariant in that the distance between any two PLBs from the same page of PLB descriptors is 128 PLBs or 256 MB. Based on the foregoing, the illustrated main list configuration supports a throughput maximum of 8GBs/second for newly ingested writes, and a flush processing of 128 PLBs/flush cycle or 256 MBs/flush cycle (where 256 MBs can be flushed in parallel). To further illustrate, assume multiple flush worker threads perform parallel flushing of content from stripes in the consecutive order denoted by the main list 1410. Such threads will not experience contention for the same page of PLB descriptors unless two of the threads attempt to flush content from two stripes of PLBs having associated PLB descriptors in the same page. For such contention to occur in this example, the two threads would have to simultaneously be flushing content from two stripes which are 256 MB apart from one another in the list 1410. It should be noted that if the system operates at a throughput rate which is more than 8Bs/second or operates at a higher flush rate of more than 256 MBs/flush cycle, one or more additional sub ubers can be added such that the processing described herein can configure a total of 3 sub ubers rather than 2 sub ubers.

In at least one embodiment of the combined approach and complete solution, the main list generated as described in connection with FIGS. 11, 12 and 13 can be used in combination with a hash table identifying reserved chunks or stripes of PLBs such as described in connection with the third alternative approach and solution. In such an embodiment, processing as described in connection with FIG. 10C can be performed as discussed above using the hash table and also using the main list generated as described in connection with FIGS. 11, 12 and 13.

Figure 14:
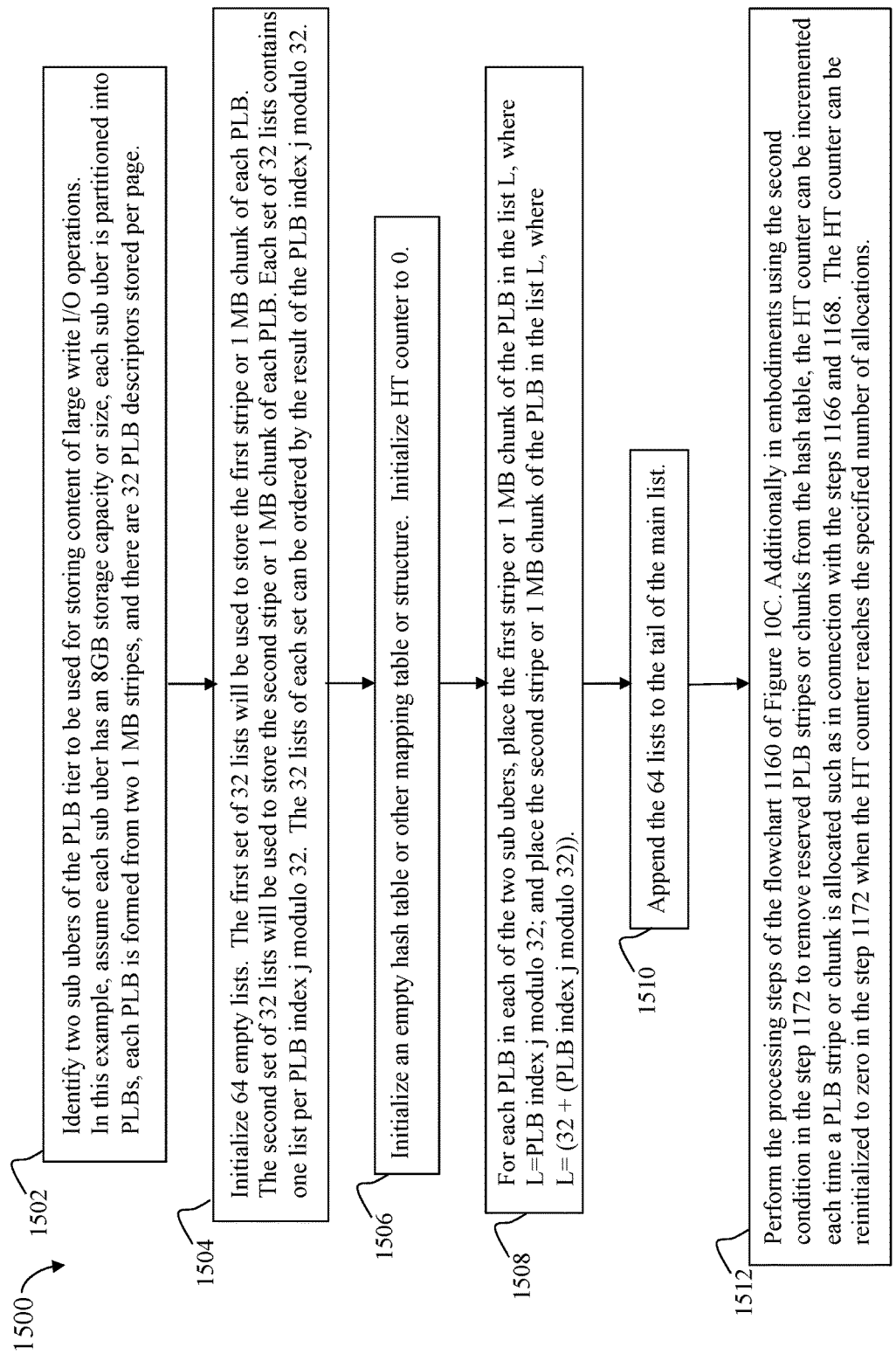

Referring to FIG. 14, shown is a flowchart 1500 of processing steps that can be performed in at least one embodiment in accordance with the techniques of the present disclosure. The steps of 1500 summarize processing described above in connection with at least one embodiment of the combined approach and solution.

At the step 1502, processing can be performed to identify two sub ubers of the PLB tier to be used for storing content of large write I/O operations. In this example as discussed above, assume each sub uber has an 8 GB storage capacity or size, each sub uber is partitioned into PLBs, each PLB is formed from two 1 MB stripes, and there are 32 PLB descriptors stored per page. From the step 1502, control proceeds to the step 1504.

At the step 1504, processing can be performed to initialize 64 empty lists. The first set of 32 lists will be used to store the first stripe or 1 MB chunk of each PLB. The second set of 32 lists will be used to store the second stipe or 1 MB chunk of each PLB. Each set of 32 lists contains one list per PLB index j modulo 32. The 32 lists of each set can be ordered by the result of the PLB index j modulo 32. From the step 1504, control proceeds to the step 1506.

At the step 1506, processing can initialize an empty hash table or other mapping table or structure. Initialize HT counter to 0. From the step 1506, control proceeds to the step 1508.

At the step 1508, for each PLB in each of the two sub ubers, place the first stripe or 1 MB chunk of the PLB in the list L, where L=PLB index j modulo 32; and place the second stripe or 1 MB chunk of the PLB in the list L, where L=(32+(PLB index j modulo 32)). From the step 1508, control proceeds to the step 1510.

At the step 1510, processing can be performed to append the 64 lists to the tail of the main list. Generally, the steps 1502, 1504, 1506, 1508 and 1510 can be performed for each subsequent set of two sub ubers used in connection with the techniques of the present disclosure. From the step 1510, control proceeds to the step 1512.

At the step 1512, the processing steps of the flowchart 1160 of FIG. 10C can be performed in connection with servicing received write I/O operations. Additionally in embodiments using the second condition in the step 1172 of FIG. 10C to remove reserved PLB stripes or chunks from the hash table, the HT counter can be incremented each time a PLB stripe or chunk is allocated such as in connection with the steps 1166 and 1168. In such embodiments using the HT counter, the HT counter can be reinitialized to zero in the step 1172 when the HT counter reaches the specified number of allocations.

With the combined approach and solution, many benefits can be achieved. The system can avoid flush constraints blockages and avoid PLB descriptor page contentions during flushing. The system can attempt to flush all stripes of the same PLB in one flush cycle. A read I/O operation which reads content from consecutive logical addresses or offsets of the same volume or LUN can be performed using a single PLB read. Delayed writes to consecutive logical addresses or offsets of the same volume or LUN can be written to the same PLB. Overwriting or deleting content stored at consecutive logical addresses or offsets can result in an empty PLB to avoid garbage collection.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
identifying a plurality of blocks of storage available for allocation, wherein each of the plurality of blocks is partitioned into a plurality of storage chunks;
generating a main list denoting an allocation order of the plurality of storage chunks;
receiving a first write I/O operation that writes first data to a first target logical address; and
responsive to receiving the first write I/O operation, performing first processing including:
allocating a first storage chunk from the plurality of storage chunks in accordance with the allocation order denoted by the main list, wherein a first block of the plurality of blocks includes the first storage chunk and a second storage chunk of the plurality of storage chunks;
storing the first data in the first storage chunk of the first block;
removing the second storage chunk of the first block from the main list; and
creating, in a mapping table, a first mapping between the first target logical address and the first block, wherein the first mapping indicates that the second storage chunk of the first block i) is available for allocation and ii) is reserved for storing content written to a logical address included in a first volume logical address range, wherein the first volume logical address range includes the first target logical address.

2. The computer-implemented method of claim 1, further comprising:
receiving a second write I/O operation that writes second data to a second target logical address; and
determining whether the mapping table includes a mapping with a corresponding volume logical address range including the second target logical address, wherein said determining whether the mapping table includes the mapping with the corresponding volume logical address range including the second target logical address further includes:
determining whether the second target logical address is included in the first volume logical address range of the first mapping; and
responsive to determining that the second target logical address is included in the first volume logical address range, determining that the mapping table includes the mapping with the corresponding volume logical address range including the second target logical address.

3. The computer-implemented method of claim 2, further comprising:
responsive to determining that the second target logical address is included in the first volume logical address range, performing second processing including:
allocating the second storage chunk for storing the second data of the second target logical address; and
storing the second data in the second storage chunk of the first block.

4. The computer-implemented method of claim 2, further comprising:
responsive to determining that the mapping table does not include the mapping with the corresponding volume logical address range including the second target logical address, performing third processing including:
allocating a third storage chunk of the plurality of storage chunks in accordance with the allocation order denoted by the main list, wherein a second block of the plurality of blocks includes the third storage chunk and a fourth storage chunk of the plurality of storage chunks; storing the second data in the third storage chunk of the second block;
removing the third storage chunk of the second block from the main list; and
creating, in the mapping table, a second mapping between the second target logical address and the second block, wherein the second mapping indicates that the fourth storage chunk of the second block i) is available for allocation and ii) is reserved for storing content written to a logical address included in a second volume logical address range, wherein the second volume logical address range includes the second target logical address.

5. The computer-implemented method of claim 1, further comprising:
determining, in accordance with one or more criteria, whether to remove one or more reserved storage chunks of the mapping table, wherein the one or more reserved storage chunks includes the second storage chunk associated with the first mapping; and
responsive to determining to remove one or more reserved storage chunks from the mapping table performing second processing including:
removing the second storage chunk associated with the first mapping from the mapping table indicating that the second storage chunk is no longer reserved; and
adding the second storage chunk of the first block to the main list indicating that the second storage chunk is available for subsequent allocation in accordance with the allocation order denoted by the main list.

6. The computer-implemented method of claim 5, wherein said adding the second storage chunk to the main list includes adding the second storage chunk to a head of the main list.

7. The computer-implemented method of claim 6, wherein after said adding the second chunk to the head of the main list is performed, the head of the main list identifies the second storage chunk as a next subsequent chunk to be allocated in accordance with the allocation order denoted by the main list.

8. The computer-implemented method of claim 5, wherein the one or more criteria includes a condition that indicates to remove the one or more reserved storage chunks from the mapping table periodically after a specified amount of time has elapsed.

9. The computer-implemented method of claim 5, wherein the one or more criteria includes a condition that indicates to remove the one or more reserved storage chunks from the mapping table periodically after a specified number of chunk allocations is performed.

10. The computer-implemented method of claim 9, wherein the specified number of chunk allocations includes allocating one or more chunks from the main list in accordance with the allocation order denoted by the main list.

11. The computer-implemented method of claim 10, wherein the specified number of chunk allocations includes allocating one or more reserved chunks each associated with a corresponding mapping of the mapping table and each associated with a corresponding volume logical address range.

12. The computer-implemented method of claim 1, wherein the mapping table is a hash table, and logical addresses are used as keys to index into the hash table to a corresponding hash table entry associated with a volume logical address range and a reserved storage chunk.

13. The computer-implemented method of claim 1, wherein each of the plurality of blocks includes N storage chunks, and wherein said generating the main list further comprises:
    forming N sets of lists, wherein each of the N sets of lists identifies corresponding ones of the N storage chunks from each of the plurality of blocks.

14. The computer-implemented method of claim 13, wherein a first set of the N sets of lists includes a first storage chunks, wherein each of the first storage chunks is from a corresponding one of the plurality of blocks, wherein said each first chunks is one of the N storage chunks of the corresponding one of the plurality of blocks, and wherein said forming the N sets of lists includes:
    for each of the first storage chunks from each of the plurality of blocks, placing said each of the first storage chunks in a selected list, of the first set having an associated index L, wherein L=j modulo J2, wherein j is a block index uniquely identifying said each block of the plurality of blocks, and wherein J2 denotes a number of block descriptors stored in a single page.

15. The computer-implemented method of claim 14, wherein a second set of the N sets of lists includes a second storage chunks, wherein each of the second storage chunks is from an associated one of the plurality of blocks, wherein said each second chunks is one of the N storage chunks of the associated one of the plurality of blocks, and wherein said forming the N sets of lists includes:
    for each of the second storage chunks from each of the plurality of blocks, placing said each of the second storage chunks in a selected list, of the second set having an associated index L2, wherein L2=J2+(j modulo J2).

16. The computer-implemented method of claim 15, wherein lists of the first set are ordered by increasing values of L associated with the lists of the first set, and wherein lists of the second set are ordered by increasing values of L2 associated with the lists of the second set.

17. The computer-implemented method of claim 16, wherein the plurality of blocks are included in a plurality of storage areas, wherein each of the plurality of storage areas has an associated unique index k, wherein each respective storage chunk, in each respective list of the first set and the second set, has an associated index k identifying a particular one of the plurality of storage areas which includes said each respective storage chunk, and
    wherein each of the respective storage chunks, in said each respective list of the first set and the second set, is ordered based on increasing value of said associated index k and wherein the respective storage chunks in said each respective list having a same associated index k are ordered based on increasing block index values for j corresponding to blocks which include the respective storage chunks in said each respective list.

18. The computer-implemented method of claim 13, wherein said generating the main list further comprises:
    appending the N sets of lists to a tail of an existing main list, wherein the tail denotes the end of the main list and is associated with a corresponding end storage chunk, wherein a head of the main list identifies a next storage chunk to be allocated in the allocation order, wherein the allocation order denoted by the main list is a consecutive allocation ordering of storage chunks from the head of the main list to the tail of the main list.

19. A system comprising:
    one or more processors; and
    a memory comprising code stored thereon that, when executed, performs a method comprising:
    identifying a plurality of blocks of storage available for allocation, wherein each of the plurality of blocks is partitioned into a plurality of storage chunks;
    generating a main list denoting an allocation order of the plurality of storage chunks; receiving a first write I/O operation that writes first data to a first target logical address; and
    responsive to receiving the first write I/O operation, performing first processing including:
        allocating a first storage chunk from the plurality of storage chunks in accordance with the allocation order denoted by the main list, wherein a first block of the plurality of blocks includes the first storage chunk and a second storage chunk of the plurality of storage chunks;
        storing the first data in the first storage chunk of the first block;
        removing the second storage chunk of the first block from the main list; and
        creating, in a mapping table, a first mapping between the first target logical address and the first block, wherein the first mapping indicates that the second storage chunk of the first block i) is available for allocation and ii) is reserved for storing content written to a logical address included in a first volume logical address range, wherein the first volume logical address range includes the first target logical address.

20. A non-transitory computer readable medium comprising code stored thereon that, when executed, performs a method comprising:
    identifying a plurality of blocks of storage available for allocation, wherein each of the plurality of blocks is partitioned into a plurality of storage chunks;
    generating a main list denoting an allocation order of the plurality of storage chunks; receiving a first write I/O operation that writes first data to a first target logical address; and
    responsive to receiving the first write I/O operation, performing first processing including:
        allocating a first storage chunk from the plurality of storage chunks in accordance with the allocation order denoted by the main list, wherein a first block of the plurality of blocks includes the first storage chunk and a second storage chunk of the plurality of storage chunks;
        storing the first data in the first storage chunk of the first block; removing the second storage chunk of the first block from the main list; and
        creating, in a mapping table, a first mapping between the first target logical address and the first block, wherein the first mapping indicates that the second storage chunk of the first block i) is available for allocation and ii) is reserved for storing content written to a logical address included in a first volume logical address range, wherein the first volume logical address range includes the first target logical address.

* * * * *